(12) United States Patent
Aoki et al.

(10) Patent No.: US 7,062,151 B2
(45) Date of Patent: Jun. 13, 2006

(54) INFORMATION PROCESSING APPARATUS AND METHOD, AND RECORDING MEDIUM

(75) Inventors: Yukihiko Aoki, Tokyo (JP); Shinichiro Sugai, Saitama (JP); Keiji Kaneko, Tokyo (JP)

(73) Assignee: Sony Corporation, Tokyo (JP)

( * ) Notice: Subject to any disclaimer, the term of this patent is extended or adjusted under 35 U.S.C. 154(b) by 1034 days.

(21) Appl. No.: 09/727,919

(22) Filed: Dec. 1, 2000

(65) Prior Publication Data
US 2001/0041044 A1 Nov. 15, 2001

(30) Foreign Application Priority Data
Dec. 3, 1999 (JP) ............................. P11-344391

(51) Int. Cl.
*H04N 5/91* (2006.01)
(52) U.S. Cl. ........................................... 386/83; 386/46
(58) Field of Classification Search .................. 386/1, 386/45, 46, 52, 125, 126; 380/45
See application file for complete search history.

(56) References Cited
U.S. PATENT DOCUMENTS
6,038,368 A * 3/2000 Boetje et al. .................. 386/52

6,289,169 B1 * 9/2001 Okuyama ..................... 386/83
6,363,149 B1 * 3/2002 Candelore .................... 380/45
6,711,343 B1 * 3/2004 Matsumi et al. .............. 386/46

\* cited by examiner

*Primary Examiner*—James J. Groody
*Assistant Examiner*—Christopher Onuaku
(74) *Attorney, Agent, or Firm*—Finnegan, Henderson, Farabow, Garrett & Dunner, L.L.P.

(57) ABSTRACT

An IRD (Integrated Receiver-Decoder) causes SmartFile information of a D-VHS (Digital-Video Home System) to be read so as to operate the D-VHS on the basis of the SmartFile information. The IRD instructs the D-VHS to record a program, extracts content information and relevant information from a broadcast signal received by an antenna, and outputs the content information and relevant information to the D-VHS. The D-VHS records the input content information and relevant information in accordance with an instruction from the IRD. Furthermore, the IRD causes the recorded relevant information to be read from the D-VHS and displays it on a monitor, selects a program on the basis of the displayed relevant information, and sends an instruction for playing back the selected program to the D-VHS. The D-VHS plays back the content information in accordance with this playback instruction.

14 Claims, 35 Drawing Sheets

FIG. 4

| RELEVANT INFORMATION | IRD | |
|---|---|---|
| | SI Table | descriptor |
| TITLE | EIT | DM name descriptor |
| PROVIDER INFORMATION | NIT | service list descriptor |
| PROVIDER NAME | SDT | DM name descriptor |
| GENRE CODE | EIT | content descriptor |

FIG. 5

| D-VHS | IRD |
|---|---|
| NAME DISPLAYED ON SMART FILE | SATELLITE BROADCASTING GENRE |
| SPECIAL | |
| MOVIE | FOREIGN MOVIE/JAPANESE MOVIE |
| NEWS | NEWS/REPORTS |

FIG. 6

| | MSB | | | | | | LSB |
|---|---|---|---|---|---|---|---|
| OPCODE | \multicolumn{7}{l|}{VENDOR DEPENDENT(00₁₆)} |

| | |
|---|---|
| OPCODE | VENDOR DEPENDENT(00$_{16}$) |
| OPERAND0 | company_id(080046$_{16}$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | tape_information_type(debut_data) |
| OPERAND10 | tape_information_type_dependent_field |
| OPERAND11 | |
| OPERAND12 | |

FIG. 7

| | |
|---|---|
| OPCODE | VENDOR DEPENDENT(00$_{16}$) |
| OPERAND0 | company_id(080046$_{16}$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | toc_information_type(debut_data) |
| OPERAND10 | debut_date |
| OPERAND11 | |
| OPERAND12 | |

FIG. 8

| | MSB | | | | | | LSB |
|---|---|---|---|---|---|---|---|
| OPCODE | VENDOR DEPENDENT($00_{16}$) | | | | | | |
| OPERAND0 | company_id($08004６_{16}$) | | | | | | |
| OPERAND1 | | | | | | | |
| OPERAND2 | | | | | | | |
| OPERAND3 | attributes | | | | | | |
| OPERAND4 | | | | | | | |
| OPERAND5 | | | | | | | |
| OPERAND6 | | | | | | | |
| OPERAND7 | Smart File Read | | | | | | |
| OPERAND8 | tape | | | | | | |
| OPERAND9 | tape_information_type(tape_length) | | | | | | |
| OPERAND10 | tape_information_type_dependent_field | | | | | | |
| OPERAND11 | | | | | | | |

FIG. 9

| | MSB | | | | | | LSB |
|---|---|---|---|---|---|---|---|
| OPCODE | VENDOR DEPENDENT($00_{16}$) | | | | | | |
| OPERAND0 | company_id($08004６_{16}$) | | | | | | |
| OPERAND1 | | | | | | | |
| OPERAND2 | | | | | | | |
| OPERAND3 | attributes | | | | | | |
| OPERAND4 | | | | | | | |
| OPERAND5 | | | | | | | |
| OPERAND6 | | | | | | | |
| OPERAND7 | Smart File Read | | | | | | |
| OPERAND8 | tape | | | | | | |
| OPERAND9 | tape_information_type(tape_length) | | | | | | |
| OPERAND10 | tape_length | | | | | | |
| OPERAND11 | | | | | | | |

FIG. 10

| | MSB | | | | | | LSB |
|---|---|---|---|---|---|---|---|
| OPCODE | VENDOR DEPENDENT($00_{16}$) ||||||| 
| OPERAND0 | company_id($08004_{616}$) |||||||
| OPERAND1 | |||||||
| OPERAND2 | |||||||
| OPERAND3 | attributes |||||||
| OPERAND4 | |||||||
| OPERAND5 | |||||||
| OPERAND6 | |||||||
| OPERAND7 | Smart File Read |||||||
| OPERAND8 | tape |||||||
| OPERAND9 | tape_information_type(tape_title) |||||||
| OPERAND10 ⋮ OPERAND38 | tape_information_type_dependent_field |||||||

FIG. 11

| | MSB | | | | | | LSB |
|---|---|---|---|---|---|---|---|
| OPCODE | VENDOR DEPENDENT($00_{16}$) |||||||
| OPERAND0 | company_id($08004_{616}$) |||||||
| OPERAND1 | |||||||
| OPERAND2 | |||||||
| OPERAND3 | attributes |||||||
| OPERAND4 | |||||||
| OPERAND5 | |||||||
| OPERAND6 | |||||||
| OPERAND7 | Smart File Read |||||||
| OPERAND8 | tape |||||||
| OPERAND9 | tape_information_type(tape_title) |||||||
| OPERAND10 | |||||||
| OPERAND11 ⋮ OPERAND38 | tape_title |||||||

FIG. 12

| | MSB | | | | | | LSB |
|---|---|---|---|---|---|---|---|
| OPCODE | \multicolumn{7}{l|}{VENDOR DEPENDENT(00$_{16}$)} |

| | |
|---|---|
| OPCODE | VENDOR DEPENDENT(00$_{16}$) |
| OPERAND0 | company_id(080046$_{16}$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | tape_information_type(max_toc_number) |
| OPERAND10 | tape_information_type_dependent_field |

FIG. 13

| | |
|---|---|
| OPCODE | VENDOR DEPENDENT(00$_{16}$) |
| OPERAND0 | company_id(080046$_{16}$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | tape_information_type(max_toc_number) |
| OPERAND10 | max_toc_number |

FIG. 14

| | MSB | | | | | | LSB |
|---|---|---|---|---|---|---|---|
| OPCODE | \multicolumn{7}{c|}{VENDOR DEPENDENT($00_{16}$)} |

| | |
|---|---|
| OPCODE | VENDOR DEPENDENT($00_{16}$) |
| OPERAND0 | company_id($08004616$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | tape_information_type(toc_status) |
| OPERAND10 ⋮ OPERAND17 | tape_information_type_dependent_field |

FIG. 15

| | |
|---|---|
| OPCODE | VENDOR DEPENDENT($00_{16}$) |
| OPERAND0 | company_id($08004616$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | tape_information_type(toc_status) |
| OPERAND10 | |
| OPERAND11 | |
| OPERAND12 ⋮ OPERAND38 | toc_status |

FIG. 16

| | MSB | | | | | | LSB |
|---|---|---|---|---|---|---|---|
| OPCODE | \multicolumn{7}{l|}{VENDOR DEPENDENT($00_{16}$)} |

| | |
|---|---|
| OPCODE | VENDOR DEPENDENT($00_{16}$) |
| OPERAND0 | company_id($08004６_{16}$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | tape_information_type(continuity) |
| OPERAND10 | tape_information_type_dependent_field |

FIG. 17

| | |
|---|---|
| OPCODE | VENDOR DEPENDENT($00_{16}$) |
| OPERAND0 | company_id($08004６_{16}$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | tape |
| OPERAND9 | tape_information_type(continuity) |
| OPERAND10 | continuity_counter |

FIG. 18

| | MSB | | | | | | LSB |
|---|---|---|---|---|---|---|---|
| OPCODE | \multicolumn{7}{l|}{VENDOR DEPENDENT(00₁₆)} |
| OPERAND0 | | | | | | | |
| OPERAND1 | \multicolumn{7}{c|}{company_id(08004616)} |
| OPERAND2 | | | | | | | |
| OPERAND3 | | | | | | | |
| OPERAND4 | | | | | | | |
| OPERAND5 | \multicolumn{7}{c|}{attributes} |
| OPERAND6 | | | | | | | |
| OPERAND7 | \multicolumn{7}{c|}{Smart File Read} |
| OPERAND8 | \multicolumn{7}{c|}{toc_number} |
| OPERAND9 | \multicolumn{7}{c|}{toc_information_type(start_date)} |
| OPERAND10 | | | | | | | |
| OPERAND11 | \multicolumn{7}{c|}{toc_information_type_dependent_field} |
| OPERAND12 | | | | | | | |

FIG. 19

| | MSB | | | | | | LSB |
|---|---|---|---|---|---|---|---|
| OPCODE | \multicolumn{7}{l|}{VENDOR DEPENDENT(00₁₆)} |
| OPERAND0 | | | | | | | |
| OPERAND1 | \multicolumn{7}{c|}{company_id(08004616)} |
| OPERAND2 | | | | | | | |
| OPERAND3 | | | | | | | |
| OPERAND4 | | | | | | | |
| OPERAND5 | \multicolumn{7}{c|}{attributes} |
| OPERAND6 | | | | | | | |
| OPERAND7 | \multicolumn{7}{c|}{Smart File Read} |
| OPERAND8 | \multicolumn{7}{c|}{toc_number} |
| OPERAND9 | \multicolumn{7}{c|}{toc_information_type(start_date)} |
| OPERAND10 | | | | | | | |
| OPERAND11 | \multicolumn{7}{c|}{start_date} |
| OPERAND12 | | | | | | | |

FIG. 20

| | MSB | | | | | | LSB |
|---|---|---|---|---|---|---|---|
| OPCODE | \multicolumn{7}{l|}{VENDOR DEPENDENT($00_{16}$)} |
| OPERAND0 | \multicolumn{7}{l|}{} |
| OPERAND1 | \multicolumn{7}{l|}{company_id($080046_{16}$)} |
| OPERAND2 | \multicolumn{7}{l|}{} |
| OPERAND3 | \multicolumn{7}{l|}{} |
| OPERAND4 | \multicolumn{7}{l|}{} |
| OPERAND5 | \multicolumn{7}{l|}{attributes} |
| OPERAND6 | \multicolumn{7}{l|}{} |
| OPERAND7 | \multicolumn{7}{l|}{Smart File Read} |
| OPERAND8 | \multicolumn{7}{l|}{toc_number} |
| OPERAND9 | \multicolumn{7}{l|}{toc_information_type(start_time)} |
| OPERAND10 | \multicolumn{7}{l|}{toc_information_type_dependent_field} |
| OPERAND11 | \multicolumn{7}{l|}{} |

FIG. 21

| | MSB | | | | | | LSB |
|---|---|---|---|---|---|---|---|
| OPCODE | \multicolumn{7}{l|}{VENDOR DEPENDENT($00_{16}$)} |
| OPERAND0 | \multicolumn{7}{l|}{} |
| OPERAND1 | \multicolumn{7}{l|}{company_id($080046_{16}$)} |
| OPERAND2 | \multicolumn{7}{l|}{} |
| OPERAND3 | \multicolumn{7}{l|}{} |
| OPERAND4 | \multicolumn{7}{l|}{attributes} |
| OPERAND5 | \multicolumn{7}{l|}{} |
| OPERAND6 | \multicolumn{7}{l|}{} |
| OPERAND7 | \multicolumn{7}{l|}{Smart File Read} |
| OPERAND8 | \multicolumn{7}{l|}{toc_number} |
| OPERAND9 | \multicolumn{7}{l|}{toc_information_type(start_time)} |
| OPERAND10 | \multicolumn{7}{l|}{start_time} |
| OPERAND11 | \multicolumn{7}{l|}{} |

FIG. 22

| | MSB | | | | | | LSB |
|---|---|---|---|---|---|---|---|
| OPCODE | \multicolumn{7}{l|}{VENDOR DEPENDENT($00_{16}$)} |
| OPERAND0 | | | | | | | |
| OPERAND1 | \multicolumn{7}{l|}{company_id($080046_{16}$)} |
| OPERAND2 | | | | | | | |
| OPERAND3 | | | | | | | |
| OPERAND4 | \multicolumn{7}{l|}{attributes} |
| OPERAND5 | | | | | | | |
| OPERAND6 | | | | | | | |
| OPERAND7 | \multicolumn{7}{l|}{Smart File Read} |
| OPERAND8 | \multicolumn{7}{l|}{toc_number} |
| OPERAND9 | \multicolumn{7}{l|}{toc_information_type(duration)} |
| OPERAND10 | | | | | | | |
| OPERAND11 | \multicolumn{7}{l|}{toc_information_type_dependent_field} |
| OPERAND12 | | | | | | | |

FIG. 23

| | MSB | | | | | | LSB |
|---|---|---|---|---|---|---|---|
| OPCODE | \multicolumn{7}{l|}{VENDOR DEPENDENT($00_{16}$)} |
| OPERAND0 | | | | | | | |
| OPERAND1 | \multicolumn{7}{l|}{company_id($080046_{16}$)} |
| OPERAND2 | | | | | | | |
| OPERAND3 | | | | | | | |
| OPERAND4 | \multicolumn{7}{l|}{attributes} |
| OPERAND5 | | | | | | | |
| OPERAND6 | | | | | | | |
| OPERAND7 | \multicolumn{7}{l|}{Smart File Read} |
| OPERAND8 | \multicolumn{7}{l|}{toc_number} |
| OPERAND9 | \multicolumn{7}{l|}{toc_information_type(duration)} |
| OPERAND10 | | | | | | | |
| OPERAND11 | \multicolumn{7}{l|}{duration} |
| OPERAND12 | | | | | | | |

FIG. 24

| | MSB | | | | | | LSB |
|---|---|---|---|---|---|---|---|
| OPCODE | \multicolumn{7}{l|}{VENDOR DEPENDENT(00₁₆)} |

| | |
|---|---|
| OPCODE | VENDOR DEPENDENT(00<sub>16</sub>) |
| OPERAND0 | company_id(080046<sub>16</sub>) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | toc_number |
| OPERAND9 | toc_information_type(tape_position) |
| OPERAND10 | toc_information_type_dependent_field |
| OPERAND11 | |
| OPERAND12 | |
| OPERAND13 | |

FIG. 25

| | |
|---|---|
| OPCODE | VENDOR DEPENDENT(00<sub>16</sub>) |
| OPERAND0 | company_id(080046<sub>16</sub>) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | toc_number |
| OPERAND9 | toc_information_type(tape_position) |
| OPERAND10 | tape_position |
| OPERAND11 | |
| OPERAND12 | |
| OPERAND13 | |

| | MSB | | | | | | LSB |
|---|---|---|---|---|---|---|---|
| OPCODE | VENDOR DEPENDENT(00₁₆) ||||||||
| OPERAND0 | company_id(0800461₆) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | toc_number |
| OPERAND9 | toc_information_type(program_title) |
| OPERAND10 ⋮ OPERAND38 | toc_information_type_dependent_field |

FIG. 28

| | MSB | | | | | | LSB |
|---|---|---|---|---|---|---|---|
| OPCODE | VENDOR DEPENDENT($00_{16}$) |||||||
| OPERAND0 | company_id($080046_{16}$) |||||||
| OPERAND1 | |||||||
| OPERAND2 | |||||||
| OPERAND3 | attributes |||||||
| OPERAND4 | |||||||
| OPERAND5 | |||||||
| OPERAND6 | |||||||
| OPERAND7 | Smart File Read |||||||
| OPERAND8 | toc_number |||||||
| OPERAND9 | toc_information_type(program_title) |||||||
| OPERAND10 | program_title |||||||
| OPERAND11 ⋮ OPERAND38 | |||||||

FIG. 29

| | MSB | | | | | | LSB |
|---|---|---|---|---|---|---|---|
| OPCODE | VENDOR DEPENDENT($00_{16}$) |||||||
| OPERAND0 | company_id($080046_{16}$) |||||||
| OPERAND1 | |||||||
| OPERAND2 | |||||||
| OPERAND3 | attributes |||||||
| OPERAND4 | |||||||
| OPERAND5 | |||||||
| OPERAND6 | |||||||
| OPERAND7 | Smart File Read |||||||
| OPERAND8 | toc_number |||||||
| OPERAND9 | toc_information_type(program_genre) |||||||
| OPERAND10 | toc_information_type_dependent_field |||||||

FIG. 30

| | MSB | | | | | | LSB |
|---|---|---|---|---|---|---|---|
| OPCODE | \multicolumn{7}{l|}{VENDOR DEPENDENT($00_{16}$)} |
| OPERAND0 | \multicolumn{7}{l|}{} |
| OPERAND1 | \multicolumn{7}{l|}{company_id($080046_{16}$)} |
| OPERAND2 | \multicolumn{7}{l|}{} |
| OPERAND3 | \multicolumn{7}{l|}{} |
| OPERAND4 | \multicolumn{7}{l|}{} |
| OPERAND5 | \multicolumn{7}{l|}{attributes} |
| OPERAND6 | \multicolumn{7}{l|}{} |
| OPERAND7 | \multicolumn{7}{l|}{Smart File Read} |
| OPERAND8 | \multicolumn{7}{l|}{toc_number} |
| OPERAND9 | \multicolumn{7}{l|}{toc_information_type(program_genre)} |
| OPERAND10 | \multicolumn{7}{l|}{genre} |

FIG. 31

| | MSB | | | | | | LSB |
|---|---|---|---|---|---|---|---|
| OPCODE | \multicolumn{7}{l|}{VENDOR DEPENDENT($00_{16}$)} |
| OPERAND0 | \multicolumn{7}{l|}{} |
| OPERAND1 | \multicolumn{7}{l|}{company_id($080046_{16}$)} |
| OPERAND2 | \multicolumn{7}{l|}{} |
| OPERAND3 | \multicolumn{7}{l|}{} |
| OPERAND4 | \multicolumn{7}{l|}{attributes} |
| OPERAND5 | \multicolumn{7}{l|}{} |
| OPERAND6 | \multicolumn{7}{l|}{} |
| OPERAND7 | \multicolumn{7}{l|}{Smart File Read} |
| OPERAND8 | \multicolumn{7}{l|}{toc_number} |
| OPERAND9 | \multicolumn{7}{l|}{toc_information_type(recording_info)} |
| OPERAND10 | \multicolumn{7}{l|}{toc_information_type_dependent_field} |
| OPERAND11 | \multicolumn{7}{l|}{} |

FIG. 32

| | MSB | | | | | | LSB |
|---|---|---|---|---|---|---|---|
| OPCODE | \multicolumn{7}{l|}{VENDOR DEPENDENT($00_{16}$)} |

| | |
|---|---|
| OPCODE | VENDOR DEPENDENT($00_{16}$) |
| OPERAND0 | company_id($08004616$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | toc_number |
| OPERAND9 | toc_information_type(recording_info) |
| OPERAND10 | recording_info |
| OPERAND11 | |

FIG. 33

| | |
|---|---|
| OPCODE | VENDOR DEPENDENT($00_{16}$) |
| OPERAND0 | company_id($08004616$) |
| OPERAND1 | |
| OPERAND2 | |
| OPERAND3 | attributes |
| OPERAND4 | |
| OPERAND5 | |
| OPERAND6 | |
| OPERAND7 | Smart File Read |
| OPERAND8 | toc_number |
| OPERAND9 | toc_information_type(provider_name) |
| OPERAND10 ⋮ OPERAND20 | toc_information_type_dependent_field |

FIG. 34

| | MSB | | | | | | LSB |
|---|---|---|---|---|---|---|---|
| OPCODE | \multicolumn{7}{l}{VENDOR DEPENDENT($00_{16}$)} |
| OPERAND0 | \multicolumn{7}{l}{} |
| OPERAND1 | \multicolumn{7}{l}{company_id($080046_{16}$)} |
| OPERAND2 | \multicolumn{7}{l}{} |
| OPERAND3 | \multicolumn{7}{l}{} |
| OPERAND4 | \multicolumn{7}{l}{attributes} |
| OPERAND5 | \multicolumn{7}{l}{} |
| OPERAND6 | \multicolumn{7}{l}{} |
| OPERAND7 | \multicolumn{7}{l}{Smart File Read} |
| OPERAND8 | \multicolumn{7}{l}{toc_number} |
| OPERAND9 | \multicolumn{7}{l}{toc_information_type(provider_name)} |
| OPERAND10 | \multicolumn{7}{l}{} |
| OPERAND11 ⋮ OPERAND20 | \multicolumn{7}{l}{provider_name} |

FIG. 35

| | MSB | | | | | | LSB |
|---|---|---|---|---|---|---|---|
| OPCODE | \multicolumn{7}{l}{VENDOR DEPENDENT($00_{16}$)} |
| OPERAND0 | \multicolumn{7}{l}{} |
| OPERAND1 | \multicolumn{7}{l}{company_id($080046_{16}$)} |
| OPERAND2 | \multicolumn{7}{l}{} |
| OPERAND3 | \multicolumn{7}{l}{} |
| OPERAND4 | \multicolumn{7}{l}{attributes} |
| OPERAND5 | \multicolumn{7}{l}{} |
| OPERAND6 | \multicolumn{7}{l}{} |
| OPERAND7 | \multicolumn{7}{l}{Smart File Read} |
| OPERAND8 | \multicolumn{7}{l}{toc_number} |
| OPERAND9 | \multicolumn{7}{l}{toc_information_type(provider_info)} |
| OPERAND10 | \multicolumn{7}{l}{} |
| OPERAND11 | \multicolumn{7}{l}{toc_information_type_dependent_field} |
| OPERAND12 | \multicolumn{7}{l}{} |

FIG. 36

| | MSB | | | | | | LSB |
|---|---|---|---|---|---|---|---|
| OPCODE | \multicolumn{7}{l\|}{VENDOR DEPENDENT($00_{16}$)} |
| OPERAND0 | \multicolumn{7}{l\|}{company_id($08004616$)} |
| OPERAND1 | | | | | | | |
| OPERAND2 | | | | | | | |
| OPERAND3 | \multicolumn{7}{l\|}{attributes} |
| OPERAND4 | | | | | | | |
| OPERAND5 | | | | | | | |
| OPERAND6 | | | | | | | |
| OPERAND7 | \multicolumn{7}{l\|}{Smart File Read} |
| OPERAND8 | \multicolumn{7}{l\|}{toc_number} |
| OPERAND9 | \multicolumn{7}{l\|}{toc_information_type(provider_info)} |
| OPERAND10 | \multicolumn{7}{l\|}{provider_info} |
| OPERAND11 | | | | | | | |
| OPERAND12 | | | | | | | |

FIG. 37

| | MSB | | | | | | LSB |
|---|---|---|---|---|---|---|---|
| OPCODE | \multicolumn{7}{l\|}{VENDOR DEPENDENT($00_{16}$)} |
| OPERAND0 | \multicolumn{7}{l\|}{company_id($08004616$)} |
| OPERAND1 | | | | | | | |
| OPERAND2 | | | | | | | |
| OPERAND3 | \multicolumn{7}{l\|}{attributes} |
| OPERAND4 | | | | | | | |
| OPERAND5 | | | | | | | |
| OPERAND6 | | | | | | | |
| OPERAND7 | \multicolumn{7}{l\|}{Smart File Search} |
| OPERAND8 | \multicolumn{7}{l\|}{toc_number} |

FIG. 38

| | MSB | | | | | | LSB |
|---|---|---|---|---|---|---|---|
| OPCODE | \multicolumn{7}{l|}{VENDOR DEPENDENT(00₁₆)} |

| | |
|---|---|
| OPCODE | VENDOR DEPENDENT(00₁₆) |
| OPERAND0 | company_id(0800461₆) |
| OPERAND1 | |
| OPERAND2 | |
| OPERAND3 | attributes |
| OPERAND4 | |
| OPERAND5 | |
| OPERAND6 | |
| OPERAND7 | Smart File Search |
| OPERAND8 | blank |

FIG. 39

| | |
|---|---|
| OPCODE | VENDOR DEPENDENT(00₁₆) |
| OPERAND0 | company_id(0800461₆) |
| OPERAND1 | |
| OPERAND2 | |
| OPERAND3 | attributes |
| OPERAND4 | |
| OPERAND5 | |
| OPERAND6 | |
| OPERAND7 | Stream Read |
| OPERAND8 | channel number |
| OPERAND9 | information_type |
| OPERAND10 | information_type_dependent_field(FF₁₆) |
| ⋮ | |

INFORMATION PROCESSING APPARATUS AND METHOD, AND RECORDING MEDIUM

BACKGROUND OF THE INVENTION

1. Field of the Invention

The present invention relates to an information processing apparatus and an information processing method, and to a recording medium therefor. More particularly, the present invention relates to an information processing apparatus and an information processing method, in which an information processing apparatus controls another information processing apparatus so as to allow recording of a broadcast signal and relevant information and so as to allow selection of a program by reading the recorded relevant information in order to play back the selected programs, and to a recording medium therefor.

2. Description of the Related Art

A technique is being progressively applied in which a video cassette recorder records relevant information, such as the title of a recorded program, the time recorded, and the recorded program length on a cassette tape in which video data is recorded, and reads this recorded relevant information so as to display it in a list; by selecting a program from the list, the selected program may be played back from the cassette tape. As an IC card for recording and managing the relevant information of programs recorded in such a manner, there is available one called a "SmartFile" (trademark). This IC card is formed so as to be affixed to a cassette tape. When the tape cassette is loaded into the video cassette recorder, the video cassette recorder records relevant information in the IC card affixed to the cassette tape, reads the recorded relevant information from the IC card as necessary, and displays the information in a list, so that a selection may be made from the list in order to play back the selected recorded program.

When a video cassette recorder capable of playing back a cassette tape having this IC card is connected to what is commonly called an IRD (Integrated Receiver-Decoder) which receives a digital satellite broadcast using an IEEE 1394 serial bus, it is possible to transmit content information representing the contents of the program received by the IRD to the video cassette recorder via the IEEE 1394 serial bus and to record the content information in a cassette tape.

However, in the above-described method, writing to and reading from the IC card can be performed only by an operation from the main unit of the video cassette recorder or by an operation from a remote controller, resulting in a problem in that relevant information corresponding to the content information received by the IRD cannot be recorded in the IC card.

SUMMARY OF THE INVENTION

The present invention has been achieved in view of such circumstances. The present invention aims to allow the writing and reading of relevant information in a SmartFile via an IEEE 1394 serial bus, thereby improving ease of operation.

To this end, in one aspect, the present invention provides an information processing apparatus for receiving a broadcast signal and for transmitting information about a program created from the broadcast signal to another information processing apparatus which is connected via a network, the information processing apparatus comprising: first extraction means for extracting content information of the program; second extraction means for extracting relevant information of the program; first output means for outputting the content information extracted by the first extraction means to the other information processing apparatus via the network so that the content information is recorded in a first recording medium of the other information processing apparatus; conversion means for converting the relevant information extracted by the second extraction means into a format in which the information can be processed by the other information processing apparatus; and second output means for outputting the relevant information whose format is converted by the conversion means to the other information processing apparatus via the network so that the relevant information whose format is converted by the conversion means is recorded in a second recording medium of the other information processing apparatus.

The network may comprise an IEEE 1394 serial bus.

The first recording medium may be a video cassette.

The second recording medium may be an IC card attached to the first recording medium.

The relevant information may contain at least one of the title, provider information, a provider name, a genre code, the recorded position in the first recording medium, the recording start date and time, and the number of updates.

In another aspect, the present invention provides an information processing method for use with an information processing apparatus for receiving a broadcast signal and for transmitting information of a program created from the broadcast signal to another information processing apparatus which is connected via a network, the information processing method comprising: a first extraction step of extracting content information of the program; a second extraction step of extracting relevant information of the program; a first output step of outputting the content information extracted in the first extraction step to the other information processing apparatus via the network so that the information is recorded in a first recording medium of the other information processing apparatus; a conversion step of converting the relevant information extracted in the second extraction step into a format in which the information can be processed by the other information processing apparatus; and a second output step of outputting the relevant information whose format is converted in the conversion step to the other information processing apparatus via the network so that the information is recorded in a second recording medium of the other information processing apparatus.

In another aspect, the present invention provides a computer-readable recording medium, having recorded therein a program, for use with an information processing apparatus for receiving a broadcast signal and for transmitting information of a program created from the broadcast signal to another information processing apparatus which is connected via a network, the program comprising: a first extraction step of extracting content information of the program; a second extraction step of extracting relevant information of the program; a first output step of outputting the content information extracted in the first extraction step to the other information processing apparatus via the network so that the information is recorded in a first recording medium of the other information processing apparatus; a conversion step of converting the relevant information extracted in the second extraction step into a format in which the information can be processed by the other information processing apparatus; and a second output step of outputting the relevant information whose format is converted in the conversion step to the other information processing apparatus via the network so that the information is recorded in a second recording medium of the other information processing apparatus.

In another aspect, the present invention provides an information processing apparatus for receiving information about a program from another information processing apparatus, which is connected via a network, having a first recording medium in which content information of programs is recorded and a second recording medium in which relevant information of programs is recorded, the information processing apparatus comprising: reading means for reading the relevant information recorded in the second recording medium of the other information processing apparatus via the network; conversion means for converting the relevant information which is read from the reading means into a format in which the information can be processed; display control means for controlling the display of the relevant information whose format is converted by the conversion means; selection means for selecting a desired program on the basis of the relevant information whose display is controlled by the display control means; and playback means for controlling the other information processing apparatus via the network and for playing back the content information of the program selected by the selection means from the first recording medium.

The information processing apparatus may further comprise: storage means for storing the relevant information which is converted by the conversion means; and updating means for comparing the relevant information read by the reading means with the relevant information stored by the storage means, and for updating the relevant information stored in the storage means to the relevant information read by the reading means.

The network may comprise an IEEE 1394 serial bus.

The first recording medium may be a video cassette.

The second recording medium may be an IC card attached to the first recording medium.

The relevant information may contain at least one of the title, provider information, a provider name, a genre code, the recorded position in the first recording medium, the recording start date and time, and the number of updates.

In another aspect, the present invention provides an information processing method for use with an information processing apparatus for receiving information of a program from another information processing apparatus, which is connected via a network, having a first recording medium in which content information of programs is recorded and a second recording medium in which relevant information of programs is recorded, the information processing method comprising: a reading step of reading the relevant information recorded in the second recording medium of the other information processing apparatus via the network; a conversion step of converting the relevant information which is read in the reading step into a format in which the information can be processed; a display control step of controlling the display of the relevant information whose format is converted in the conversion step; a selection step of selecting a desired program on the basis of the relevant information whose display is controlled in the display control step; and a playback step of controlling the other information processing apparatus via the network and for playing back the content information of the program selected in the selection step from the first recording medium.

In another aspect, the present invention provides a computer-readable recording medium, having recorded therein a program, for use with an information processing apparatus for receiving information of a program from another information processing apparatus, which is connected via a network, having a first recording medium in which content information of programs is recorded and a second recording medium in which relevant information of programs is recorded, the program comprising: a reading step of reading the relevant information recorded in the second recording medium of the other information processing apparatus via the network; a conversion step of converting the relevant information which is read in the reading step into a format in which the information can be processed; a display control step of controlling the display of the relevant information whose format is converted in the conversion step; a selection step of selecting a desired program on the basis of the relevant information whose display is controlled in the display control step; and a playback step of controlling the other information processing apparatus via the network and for playing back the content information of the program selected in the selection step from the first recording medium.

In another aspect, the present invention provides an information processing apparatus for recording information of programs from another information processing apparatus which is connected through a network, the information processing apparatus comprising: first acquiring means for acquiring a first instruction from the other information processing apparatus via the network; first recording means for recording content information of the program supplied from the other information processing apparatus via the network into a first recording medium on the basis of the first instruction acquired by the acquiring means; second acquiring means for acquiring a second instruction from the other information processing apparatus via the network; and second recording means for recording relevant information of the program into a second recording medium which is attached to the first recording medium on the basis of the second instruction acquired by the second acquiring means.

The network may comprise an IEEE 1394 serial bus.

The first recording medium may be a video cassette.

The second recording medium may be an IC card attached to the first recording medium.

The relevant information may contain at least one of the title, provider information, a provider name, a genre code, the recorded position in the first recording medium, the recording start date and time, and the number of updates.

In another aspect, the present invention provides an information processing method for use with an information processing apparatus for recording information of a program from another information processing apparatus which is connected through a network, the information processing method comprising: a first acquiring step of acquiring a first instruction from the other information processing apparatus via the network; a first recording step of recording content information of the program, supplied from the other information processing apparatus via the network, into a first recording medium on the basis of the first instruction acquired in the first acquiring step; a second acquiring step of acquiring a second instruction from the other information processing apparatus via the network; and a second recording step of recording the relevant information of the program into a second recording medium attached to the first recording medium on the basis of the second instruction acquired in the second acquiring step.

In another aspect, the present invention provides a computer-readable recording medium, having recorded therein a program, for use with an information processing apparatus for recording information of a program from another information processing apparatus which is connected through a network, the program comprising: a first acquiring step of acquiring a first instruction from the other information processing apparatus via the network; a first recording step of recording content information of the program, supplied from the other information processing apparatus via the network, into a first recording medium on the basis of the first instruction acquired in the first acquiring step; a second acquiring step of acquiring a second instruction from the other information processing apparatus via the network; and a second recording step of recording the relevant information of the program into a second recording medium attached to the first recording medium on the basis of the second instruction acquired in the second acquiring step.

In another aspect, the present invention provides an information processing apparatus for outputting information of a program to another information processing apparatus which is connected via a network in a case where a first recording medium in which content information of programs is recorded and a second recording medium in which relevant information of the programs is recorded are loaded, the information processing apparatus comprising: first acquiring means for acquiring a first instruction from the other information processing apparatus via the network; reading means for reading the relevant information recorded in the second recording medium and outputting the information to the other information processing apparatus via the network in accordance with the first instruction; second acquiring means for acquiring information about content information of the program selected by the other information processing apparatus on the basis of the relevant information read by the reading means; and playback means for playing back the content information from the first recording medium on the basis of information about the content information acquired by the second acquiring means.

The network may comprise an IEEE 1394 serial bus.

The first recording medium may be a video cassette.

The second recording medium may be an IC card attached to the first recording medium.

The relevant information may contain at least one of the title, provider information, a provider name, a genre code, the recorded position in the first recording medium, the recording start date, and the number of updates.

In another aspect, the present invention provides an information processing method for use with an information processing apparatus for outputting information of a program to another information processing apparatus which is connected via a network in a case where a first recording medium in which content information of programs is recorded and a second recording medium in which relevant information of the programs is recorded are loaded, the information processing method comprising: a first acquiring step of acquiring a first instruction from the other information processing apparatus via the network; a reading step of reading the relevant information recorded in the second recording medium and outputting the information to the other information processing apparatus via the network in accordance with the first instruction; a second acquiring step of acquiring information about content information of the program selected by the other information processing apparatus on the basis of the relevant information read in the reading step; and a playback step of playing back the content information from the first recording medium on the basis of information about the content information acquired in the second acquiring step.

In another aspect, the present invention provides a computer-readable recording medium, having recorded therein a program, for use with an information processing apparatus for outputting information of a program to another information processing apparatus which is connected via a network in a case where a first recording medium in which content information of programs is recorded and a second recording medium in which relevant information of the programs is recorded are loaded, the program comprising: a first acquiring step of acquiring a first instruction from the other information processing apparatus via the network; a reading step of reading the relevant information recorded in the second recording medium and outputting the information to the other information processing apparatus via the network in accordance with the first instruction; a second acquiring step of acquiring information about content information of the program selected by the other information processing apparatus on the basis of the relevant information read in the reading step; and a playback step of playing back the content information from the first recording medium on the basis of information about the content information acquired in the second acquiring step.

The above and further objects, aspects and novel features of the invention will become more fully apparent from the following detailed description when read in conjunction with the accompanying drawings.

BRIEF DESCRIPTION OF THE DRAWINGS

FIG. 4 is a diagram illustrating the correspondence between the relevant information of the IRD and the relevant information of a SmartFile.

FIG. 5 is a diagram illustrating the correspondence between the IRD and the D-VHS of a genre code of FIG. 4.

FIG. 6 is a diagram showing an AV/C (Audio-Visual/Control) command which requests the recording start date of a cassette tape.

FIG. 7 is a diagram showing an AV/C response which returns the recording start date, corresponding to the AV/C command of FIG. 6.

FIG. 8 is a diagram showing an AV/C command which requests the tape length of the cassette tape.

FIG. 9 is a diagram showing an AV/C response which returns the length of the tape, corresponding to the AV/C command of FIG. 8.

FIG. 10 is a diagram showing an AV/C command which requests the title of the cassette tape.

FIG. 11 is a diagram showing an AV/C response which returns the title of the cassette tape, corresponding to the AV/C command of FIG. 10.

FIG. 12 is a diagram showing an AV/C command which requests the number of TOC.

FIG. 13 is a diagram showing an AV/C response which returns the number of TOC, corresponding to the AV/C command of FIG. 12.

FIG. 14 is a diagram showing an AV/C command which requests the recorded TOC number.

FIG. 15 is a diagram showing an AV/C response which returns the recorded TOC number, corresponding to the AV/C command of FIG. 14.

FIG. 16 is a diagram showing an AV/C command which requests the number of updates of the SmartFile.

FIG. 17 is a diagram showing an AV/C response which returns the number of updates of the SmartFile, corresponding to the AV/C command of FIG. 16.

FIG. 18 is a diagram showing an AV/C command which requests the recording start date of a specified TOC.

FIG. 19 is a diagram showing an AV/C response which returns the recording start date of the TOC, corresponding to the AV/C command of FIG. 18.

FIG. 20 is a diagram showing an AV/C command which requests the recording start time of a TOC.

FIG. 21 is a diagram showing an AV/C response which returns the recording start time of the TOC, corresponding to the AV/C command of FIG. 20.

FIG. 22 is a diagram showing an AV/C command which requests the recorded time of the TOC.

FIG. 23 is a diagram showing an AV/C response which returns the recorded time of the TOC, corresponding to the AV/C command of FIG. 22.

FIG. 24 is a diagram showing an AV/C command which requests the recording start position and the recording end position of the TOC on the cassette tape.

FIG. 25 is a diagram showing an AV/C response which returns the recording start position and the recording end position of the TOC on the cassette tape, corresponding to the AV/C command of FIG. 24.

FIG. 28 is a diagram showing an AV/C response which returns the title of the specified TOC, corresponding to the AV/C command of FIG. 27.

FIG. 29 is a diagram showing an AV/C command which requests the genre code of the specified TOC.

FIG. 30 is a diagram showing an AV/C response which returns the genre code of the specified TOC, corresponding to the AV/C command of FIG. 29.

FIG. 31 is a diagram showing an AV/C command which requests permission of overwriting on a specified TOC, a running speed, an input source, a recording signal format, and audio information.

FIG. 32 is a diagram showing an AV/C response which returns permission of overwriting on the specified TOC, a running speed, an input source, a recording signal format, and audio information, corresponding to the AV/C command of FIG. 31.

FIG. 33 is a diagram showing an AV/C command which requests the provider name of a specified TOC.

FIG. 34 is a diagram showing an AV/C response which returns the provider name of the specified TOC, corresponding to the AV/C command of FIG. 33.

FIG. 35 is a diagram showing an AV/C command which requests the provider name of a specified TOC.

FIG. 36 is a diagram showing an AV/C response which returns the provider name of the specified TOC, corresponding to the AV/C command of FIG. 35.

FIG. 37 is a diagram showing an AV/C command which requests the start locating of a specified TOC.

FIG. 38 is a diagram showing an AV/C command which requests the start locating of an unrecorded portion.

FIG. 39 is a diagram showing an AV/C command which requests additional information of a stream in a specified program.

DESCRIPTION OF THE PREFERRED EMBODIMENT

Figure 1:
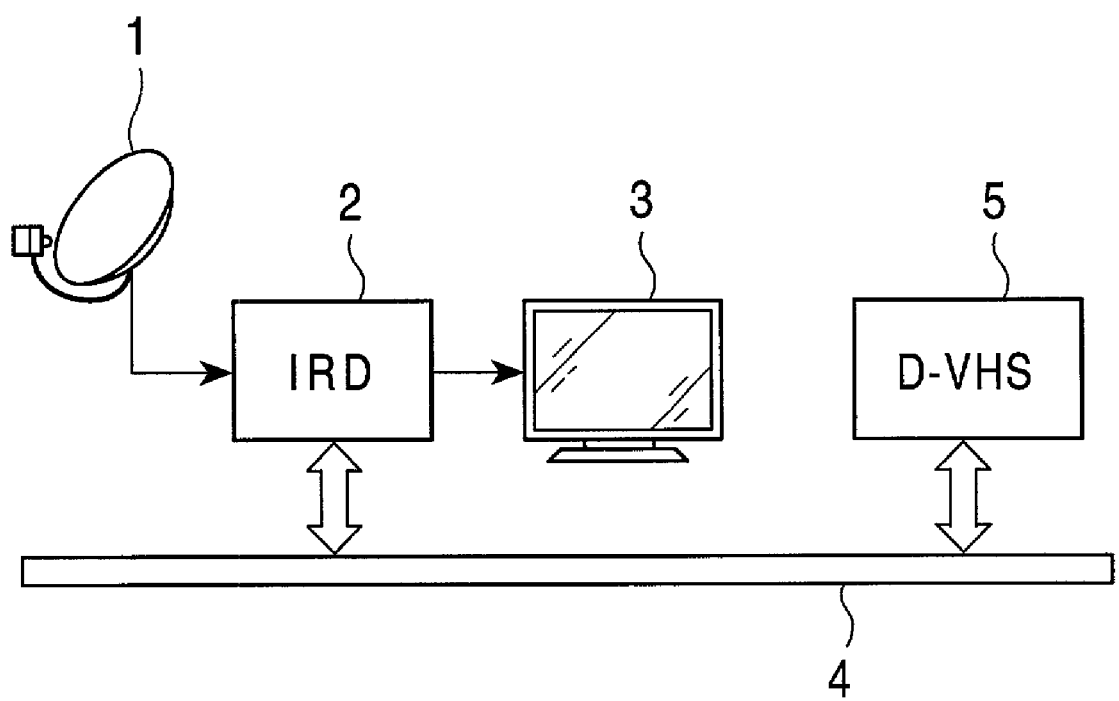
FIG. 1 is a block diagram showing the system configuration of an IRD (Integrated Receiver-Decoder) and a D-VHS (Digital-Video Home System) according to the present invention.

FIG. 1 is a block diagram showing the configuration of an embodiment of a system according to the present invention. In this system, an IRD (Integrated Receiver-Decoder) 2 and a D-VHS (Digital-Video Home System) (video cassette recorder) 5 are connected to each other by an IEEE 1394 cable 4. An antenna 1 receives a broadcast signal from a satellite (not shown), and outputs the broadcast signal to the IRD 2. The IRD 2 performs a demodulation process on the broadcast signal input from the antenna 1, displays it on a monitor 3, extracts content information and relevant information from the received broadcast signal, and outputs them to the D-VHS 5 via the IEEE 1394 cable 4. Furthermore, the IRD 2 is capable of outputting a transport stream of a predetermined channel contained in the broadcast signal as it is to the D-VHS 5 via the IEEE 1394 cable 4. By connecting the monitor 3 to the IEEE 1394 cable 4, the IRD 2 can display video on the monitor 3 via the IEEE 1394 cable 4.

The D-VHS 5 is a video cassette recorder capable of recording and playing back a transport stream in a format as it is, in addition to content information obtained by demodulating a broadcast signal of a digital method (MPEG (Moving Picture Experts Group)) used in satellite broadcasts, etc. Furthermore, the D-VHS 5 is capable of recording and playing back in a conventional analog method. In addition, the D-VHS 5 allows writing into and reading from an IC card (SmartFile card) affixed to a cassette tape.

Figure 2:
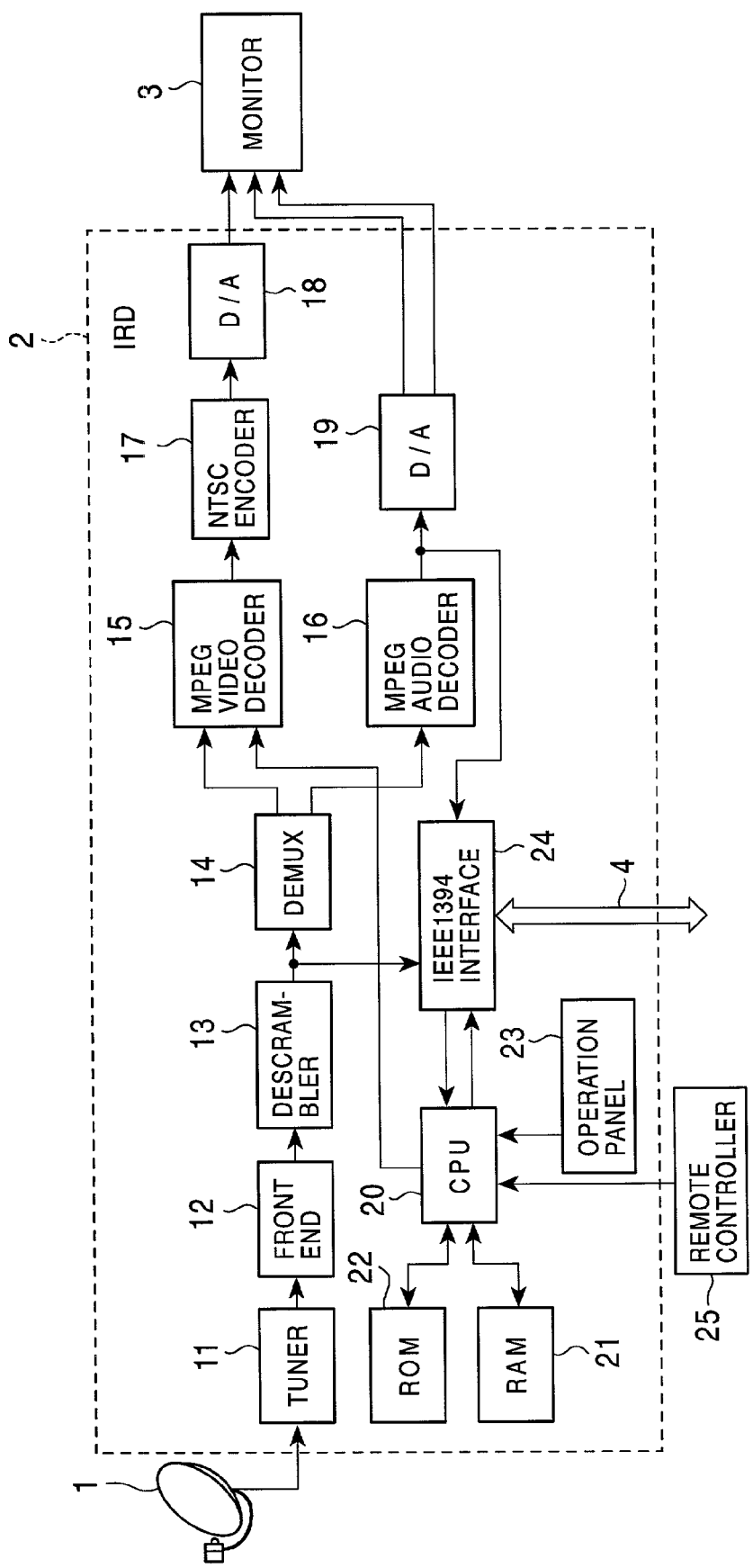
FIG. 2 is a block diagram showing the construction of the IRD according to the present invention.

FIG. 2 is a block diagram showing a detailed construction of the IRD 2. A tuner 11 demodulates a transmission channel (channel for a transponder of a satellite), including a channel specified by the user, from the broadcast signal received by the antenna 1, and sends it to a front end 12. The front end 12 demodulates the broadcast signal from the tuner 11, and performs an error correction process on the received data obtained thereby, after which this data is sent as a received data stream to a descrambler 13.

The descrambler 13 performs a descrambling process on multiplexed data of a subscriber channel within the received data stream on the basis of encryption key information of the subscriber channel stored in the IC card (not shown) loaded into the main unit of the IRD 2 so that the data is extracted, and sends the data to a demultiplexer (Demux) 14.

The demultiplexer 14 rearranges the multiplexed data for each channel, extracts only the channel specified by the user, sends a video stream composed of packets of video portions to an MPEG video decoder 15, and sends an audio stream composed of packets of audio portions to an MPEG audio decoder 16. Furthermore, the demultiplexer 14 sends a stream of video, audio, and relevant information to an IEEE 1394 interface 24. The relevant information will be described later with reference to FIGS. 4 and 5.

The MPEG video decoder 15 reconstructs the video data before being compressed and coded by decoding a video stream, and sends this data to an NTSC encoder 17. The NTSC encoder 17 converts the video data into a luminance signal and a color-difference signal of an NTSC method, and sends these signals, as NTSC data, to a digital-to-analog (D/A) conversion circuit 18. The digital-to-analog conversion circuit 18 converts the NTSC data into an analog signal, and outputs this signal to the monitor 3. Furthermore, the NTSC encoder 17 outputs the output to the IEEE 1394 interface 24.

The MPEG audio decoder 16 decodes an audio stream, thereby generating an L (Left)-channel audio signal and an R (Right)-channel audio signal, and sends these signals to a digital-to-analog conversion circuit 19. The digital-to-analog conversion circuit 19 converts the input L-ch and R-ch audio signals to analog signals, and outputs and sends this signal, as audio, through a speaker (not shown) of the monitor 3. Furthermore, the output of the MPEG audio decoder 16 is output to the IEEE 1394 interface 24.

A CPU 20 controls the entirety of the IRD 2. Furthermore, the CPU 20 converts the relevant information sent from the demultiplexer 14 via the IEEE 1394 interface 24 into code corresponding to the SmartFile, stored in a ROM 22 as necessary, and sends this code to the D-VHS 5 via the IEEE 1394 interface 24 and the IEEE 1394 cable 4. In addition, the CPU 20 causes the relevant information read from the SmartFile of the tape cassette of the D-VHS 5 to be stored in a RAM 21 via the IEEE 1394 interface 24. In addition, the CPU 20 compares the relevant information which is stored once in the RAM 21 with the relevant information which is newly read from the D-VHS 5, and when they do not match, performs updating with the newly read relevant information. The CPU 20 creates an AV/C command for controlling an operation, such as starting, stopping, etc., of recording and playback of the D-VHS 5, in accordance with an instruction input by the user by operating an operation panel 23 or a remote controller 25, and sends this command to the IEEE 1394 interface 24.

The IEEE 1394 interface 24 sends the AV/C command, the video stream data, the audio stream data, and the relevant information, which are supplied from the CPU 20, to the D-VHS 5 via the IEEE 1394 cable 4.

Figure 3:
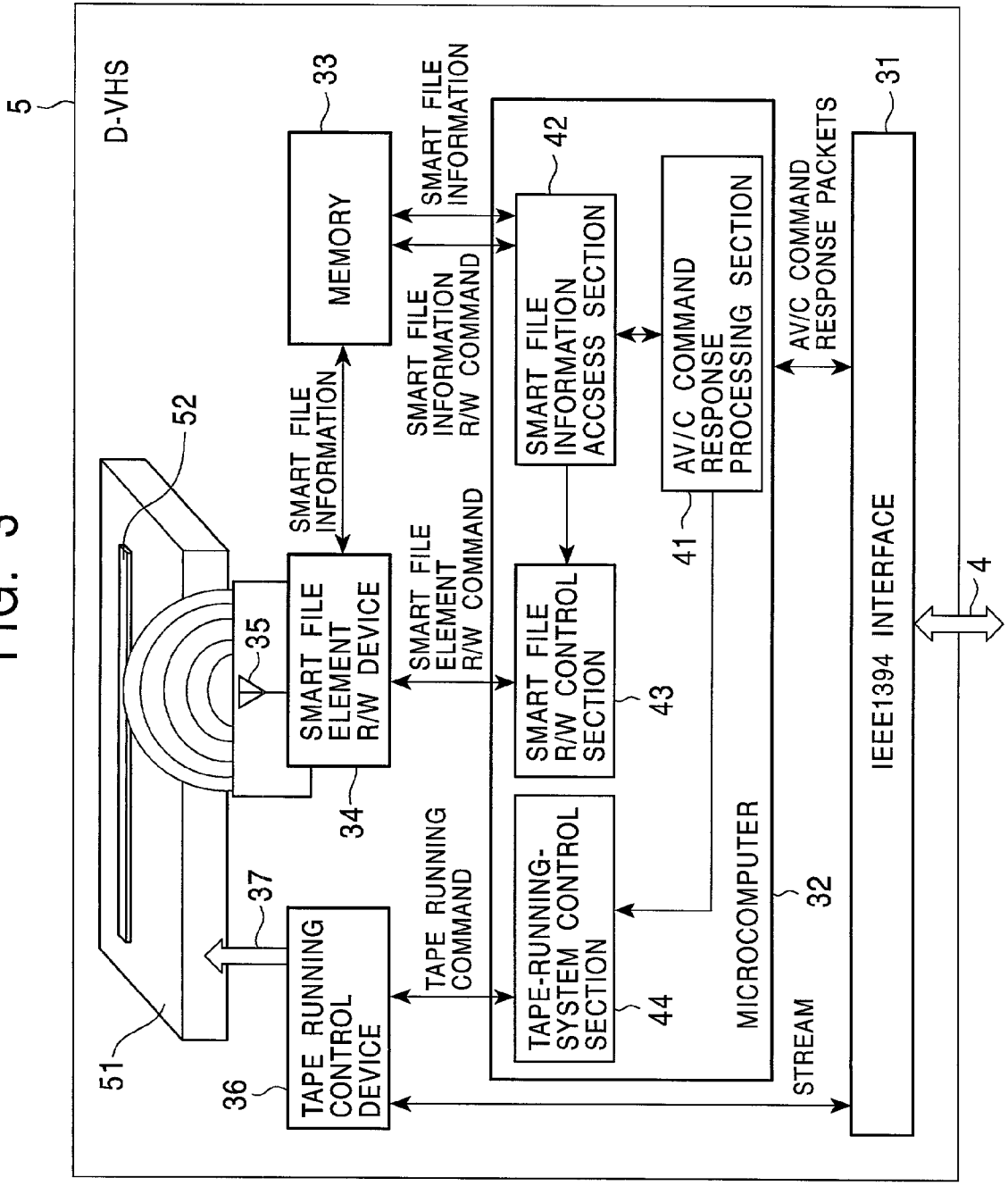
FIG. 3 is a block diagram showing the construction of the D-VHS according to the present invention.

FIG. 3 is a block diagram showing the portion of the construction of the portion of the D-VHS 5 for performing processing mainly with respect to a SmartFile. An IEEE 1394 interface 31 receives an AV/C command, video stream data, audio stream data, and relevant information, which are input via the IEEE 1394 cable 4.

A microcomputer 32 controls the operation of the entire D-VHS 5. The microcomputer 32 comprises an AV/C command response processing section 41 as software, a SmartFile information access section 42, a SmartFile R/W (Read/Write) control section 43, and a tape-running-system control section 44. The AV/C command response processing section 41 recognizes the AV/C command from the IRD 2, and sends an instruction to the SmartFile information access section 42 as necessary so as to control writing and reading of the SmartFile information into and from a memory 33 and so as to transmit an AV/C response to the IRD 2. Furthermore, the AV/C command response processing section 41 controls the tape-running-system control section 44 so that the start-locating and recording/playback of a video cassette 51 are performed.

The SmartFile information access section 42 outputs a SmartFile information R/W command to the memory 33 in accordance with an instruction from the AV/C command response processing section 41 so that the SmartFile information is read or stored. Furthermore, the SmartFile information access section 42 outputs an instruction to the SmartFile R/W control section 43, and in accordance with this command, the SmartFile R/W control section 43 controls the SmartFile element R/W device 34.

The tape-running-system control section 44 controls the tape running control device 36 in accordance with the instruction from the AV/C command response processing section 41.

The memory 33 temporarily stores the SmartFile information input from the SmartFile information access section 42 of the microcomputer 32, sends this information to the SmartFile element R/W device 34, and temporarily stores the SmartFile information which is read from a SmartFile 52 by the SmartFile element R/W device 34, and outputs the information to the microcomputer 32.

The SmartFile element R/W device 34, which is controlled by the SmartFile R/W control section 43, and records the relevant information in the SmartFile 52 affixed as a label on the video cassette 51 in accordance with radio waves emitted from a duplexer antenna 35, or plays the data back. Since the duplexer antenna 35 can exchange data in a non-contact manner with the SmartFile 52 formed by an IC card, the information recorded in the SmartFile 52 can be read by merely holding the video cassette 51 in proximity to the duplexer antenna 35.

The tape running control device 36 causes the magnetic tape (not shown) of the video cassette 51 to run in accordance with a tape running command from the tape-running-system control section 44 of the microcomputer 32, and controls a magnetic head 37 so that the video stream and the audio stream input from the IEEE 1394 interface 31 are recorded on the magnetic tape.

The SmartFile 52 stores the relevant information of a program which is recorded in the video cassette 51. The SmartFile 52 has contained therein a duplexer antenna and a memory (neither of which is shown), and is designed to allow recording and playback of a SmartFile into and from the memory in accordance with radio waves emitted from the duplexer antenna 35 of the SmartFile element R/W device 34. The SmartFile information includes the title of a recorded program, the provider information, the provider name, genre code, the time recorded, the recorded program length, the recorded position on the tape, the number of updates, etc. In the following description, the video stream and the audio stream are collectively referred to as a "stream".

Next, referring to FIG. 4, the relationships between relevant information received from a broadcast signal by the IRD 2 and the SmartFile information are described. The broadcast signal to be received by the IRD 2 is a stream according to the MPEG scheme. Within this stream there is code called an "SI (Service Information) table", and an EIT (Event Information Table), an NIT (Network Information Table), and an SDT (Service Description Table) are included therein.

The SI table is composed of many descriptors. The title is described by the DM_name_descriptor of the EIT, the provider information is described by the signal_list_descriptor of the NIT, the provider name is described by the DM_name_descriptor of the SDT, and the genre code is described by the content_descriptor of the EIT.

The title, the provider information, the provider name, the genre code, etc., are read from a corresponding descriptor, and are stored as SmartFile information in the SmartFile 52.

For the genre code, an example of the correspondence table thereof is shown in FIG. 5. The left side in the figure shows genre codes corresponding to the SmartFile of the D-VHS 5, and the right side shows genre codes of programs of a satellite broadcast to be received by the IRD 2. The codes of these genre codes differ from each other. For example, in a case where a program of a satellite broadcast is received and the received program is a "foreign movie", when the genre code of this satellite broadcast is converted into a genre code of a corresponding SmartFile, the genre code is converted into that for a genre of a "movie".

In a case where the genre code of the IRD 2 is a "Japanese movie", this is converted into a genre code of the SmartFile of the "movie". As described above, whereas in the satellite broadcast, genres of "foreign movie" and "Japanese movie" are distinguished, in the SmartFile there is one genre of "movie".

Furthermore, in the satellite broadcast, the genre of the SmartFile corresponding to the genre of "news/reports" is "news". In addition, in the SmartFile, since the genre to which "special" defined as a genre corresponds is not present in the genres of the satellite broadcast, the genre in the SmartFile is converted as "no information".

Although, as described above, the genre corresponding to "special" cannot be converted by the IRD 2, editing is possible by operating the operation panel, a remote controller, which are not shown, etc., of the D-VHS 5.

Next, the AV/C command and the AV/C response are described. The AV/C command is a command which is output by the CPU 20 of the IRD 2 when the CPU 20 is going to control the D-VHS 5 via the IEEE 1394 cable 4 when the construction is formed as shown in, for example, FIG. 1. In contrast, the AV/C response is a response which is output by the D-VHS 5 in response to the instruction of this AV/C command.

For example, in a case where the CPU 20 of the IRD 2 sends, to the microcomputer 32 of the D-VHS 5, an AV/C command which reads the recording start date within the SmartFile information recorded in the SmartFile 52 of the video cassette 51, the response which returns the information of the recording start date by the microcomputer 32 in response to that AV/C command becomes a response.

There are plural kinds of AV/C commands and AV/C responses, and herein, examples of an AV/C command and an AV/C response are described.

With respect to any AV/C command from the IRD 2, the D-VHS 5 returns an AV/C response of "rejected" in a case where the power supply is off, in a case where the video cassette 51 is not loaded, in a case where the video cassette 51 to which the SmartFile 52 is not affixed is loaded, and in a case where reading or rewriting of information of the SmartFile from or into the SmartFile 52 is being performed.

FIG. 6 shows an example of an AV/C command which reads the recording start date of the video cassette 51, which is output to the D-VHS 5 by the IRD 2. The VENDOR_DEPENDENT($00_{16}$) (the subscript "16" indicates hexadecimal) in the uppermost row indicates that it is a command for each manufacturer. "company_id" of OPERANDS 0 to 2 is a code which indicates the manufacturer, and, for example, the numeric value ($080046_{16}$) within the parenthesis indicates a specific manufacturer. "attributes" of OPERANDS 3, 4, 5, and 6 indicate AV/C command attribute information with respect to the SmartFile. "Smart_File_Read" of OPERAND 7 is an operation code, and in this example, indicates that it is a command which reads a SmartFile. "tape" of OPERAND 8 indicates the format of the SmartFile 52.

"tape_information_type (debut_date)" of OPERAND 9 indicates that it is a command which requests the recording start date. "tape_information_type_dependent_field)" of OPERANDS 10 to 12 indicates, in this example, information relevant to the recording start date to be inquired.

In the following description, the same applies to OPCODE, and OPERANDS 0 to 6, and hereinafter the same applies to OPERAND 7 up to FIG. 37, and the same applies to OPERAND 8 up to FIG. 17. Accordingly, descriptions thereof are omitted. Furthermore, since $FF_{16}$ is not in use, description thereof is omitted in the following.

When the D-VHS 5 receives an AV/C command such as that shown in FIG. 6, the D-VHS 5 reads the recording start date recorded in the SmartFile 52, and outputs an AV/C response such as that shown in FIG. 7 as a response to the IRD 2. "tape_information_type (debut_date)" of OPERAND 9 indicates that it is an AV/C response which returns the recording start date. "debut_date" of OPERANDS 10, 11, and 12 is the value of the recording start date.

FIG. 8 shows an example of an AV/C command which reads the recordable length of time of the tape of the video cassette 51, which is output to the D-VHS 5 by the IRD 2. "tape_information_type (tape_length)" of OPERAND 9 indicates that it is a command which requests the recordable length of time of the cassette tape.

When the D-VHS 5 receives an AV/C command such as that shown in FIG. 8, the D-VHS 5 reads the recordable time recorded in the SmartFile 52, and outputs an AV/C response such as that shown in FIG. 9 as a response to the IRD 2. "tape_information_type (tape_length)" of OPERAND 9 indicates that it is an AV/C response which returns the recordable length of time. "tape_length" of OPERANDS 10 and 11 indicates the recordable length of time of the entire cassette tape.

FIG. 10 shows an example of an AV/C command which reads the title of the video cassette 51, which is output to the D-VHS 5 by the IRD 2. "tape_information_type (tape_title)" of OPERAND 9 indicates that it is a command which requests the title of the video cassette 51.

When the D-VHS 5 receives an AV/C command such as that shown in FIG. 10, the D-VHS 5 reads the title of the video cassette 51 recorded in the SmartFile 52, and outputs an AV/C response such as that shown in FIG. 11 as a response to the IRD 2. "tape_information_type (tape_title)" of OPERAND 9 indicates that it is an AV/C response which returns the title of the video cassette 51. It is shown that data which indicates the title of the video cassette 51 is recorded in the "tape_title" of OPERANDS 10 to 38.

FIG. 12 shows an example of an AV/C command which reads the number of TOC (Table of Contents) which can be recorded in the SmartFile 52 of the video cassette 51. The TOC is a list of programs which are recorded as a SmartFile, and the number of TOC indicates the number of programs which can be recorded. "tape_information_type (max_toc- _number)" of OPERAND 9 indicates that it is a command which requests the number of TOC which can be recorded in the video cassette 51.

When the D-VHS 5 receives an AV/C command such as that shown in FIG. 12, the D-VHS 5 reads the number of TOC which can be recorded in the video cassette 51, which is recorded in the video cassette 51, and outputs an AV/C response such as that shown in FIG. 13 as a response to the IRD 2. "tape_information_type (max_toc_number)" of OPERAND 9 indicates that it is an AV/C response which returns the number of TOC which can be recorded in the video cassette 51. "max_toc_number" of OPERAND 10 has stored therein data which indicates the number of TOC which can be recorded in the video cassette 51.

FIG. 14 shows an example of an AV/C command which reads the number of TOC, in which programs have already been recorded, within the TOC of the SmartFile 52 of the video cassette 51. "tape_information_type (max_toc_status)" of OPERAND 9 indicates that it is a command which requests the number of TOC, in which programs have already been recorded, within the TOC of the SmartFile 52 of the video cassette 51.

When the D-VHS 5 receives an AV/C command such as that shown in FIG. 14, the D-VHS 5 reads the number of TOC, in which programs have already been recorded, within the TOC of the SmartFile 52 of the video cassette 51, and outputs an AV/C response such as that shown in FIG. 15 as a response to the IRD 2. "tape_information_type (max_toc_status)" of OPERAND 9 indicates that it is an AV/C response which returns the number of TOC, in which programs have already been recorded, within the TOC of the SmartFile 52 of the video cassette 51.

FIG. 16 shows an example of an AV/C command which reads the number of updates of the SmartFile, which is recorded in the SmartFile 52 of the video cassette 51, which is output to the D-VHS 5 by the IRD 2. "tape_information_type (continuity)" of OPERAND 9 indicates that it is a command which requests the number of updates of the SmartFile, which is recorded in the SmartFile 52 of the video cassette 51.

When the D-VHS 5 receives an AV/C command such as that shown in FIG. 16, the D-VHS 5 reads the number of updates of the SmartFile, which is recorded in the SmartFile 52, which is output to the D-VHS 5 by the IRD 2, and outputs an AV/C command such as that shown in FIG. 17 as a response to the IRD 2. "tape_information_type (continuity)" of OPERAND 9 indicates that it is an AV/C response which returns the number of updates, which is recorded in the SmartFile 52 of the video cassette 51. In the "continuity_counter" of OPERAND 10, data of the number of updates is recorded.

FIG. 18 shows an example of an AV/C command which reads the recording start date of a specified TOC within the TOC which is recorded in the SmartFile 52 of the video cassette 51, which is output to the D-VHS 5 by the IRD 2. "toc_number" of OPERAND 8 indicates the number of the specified TOC, and "toc_information_type (start-date)" of OPERAND 9 indicates that it is a command which requests the recording start date of the TOC to be specified within the TOC which is recorded in the SmartFile 52 of the video cassette 51.

When the D-VHS 5 receives an AV/C command such as that shown in FIG. 18, the D-VHS 5 reads the recording start date of the specified TOC within the TOC, which is recorded in the SmartFile 52, and outputs an AV/C response such as that shown in FIG. 19 as a response to the IRD 2. "toc_information_type (start_date)" of OPERAND 9 indicates that it is an AV/C response which returns the recording start date of the specified TOC. "start_date" of OPERANDS 10, 11, and 12 indicates the value of the recording start date. Hereinafter, in the descriptions up to FIG. 36, the same applies to the OPERAND 8, and accordingly, descriptions thereof are omitted.

FIG. 20 shows an example of an AV/C command which reads the recording start time of a specified TOC within the TOC, which is recorded in the SmartFile 52 of the video cassette 51, which is output to the D-VHS 5 by the IRD 2. "toc_information_type (start_time)" of OPERAND 9 indicates that it is a command which requests the recording start time of the TOC to be specified within the TOC which is recorded in the SmartFile 52 of the video cassette 51.

When the D-VHS 5 receives an AV/C command such as that shown in FIG. 20, the D-VHS 5 reads the recording start time of the specified TOC within the TOC which is recorded in the SmartFile 52, and outputs an AV/C response such as that shown in FIG. 21 as a response to the IRD 2. "toc_information_type (start_time)" of OPERAND 9 indicates that it is an AV/C response which returns the recording start time of the specified TOC. "start_time" of OPERANDS 10, 11, and 12 indicates the value of the recording start time.

FIG. 22 shows an example of an AV/C command which reads the recorded time of a specified TOC within the TOC which is recorded in the SmartFile 52 of the video cassette 51, which is output to the D-VHS 5 by the IRD 2. "toc_information_type (duration)" of OPERAND 9 indicates that it is a command which requests the length of the recorded time of a TOC to be specified within the TOC which is recorded in the SmartFile 52 of the video cassette 51.

When the D-VHS 5 receives an AV/C command such as that shown in FIG. 22, the D-VHS 5 reads the length of the recorded time of the specified TOC within the TOC which is recorded in the SmartFile 52, and outputs an AV/C response such as that shown in FIG. 23 as a response to the IRD 2. "toc_information_type (duration)" of OPERAND 9 indicates that it is an AV/C response which returns the recorded time of the specified TOC. "duration" of OPERANDS 10 and 11 indicates the length of the recorded time.

FIG. 24 shows an example of an AV/C command which reads the recording start position and the recording end position on the tape of the video cassette 51 of the specified TOC within the TOC which is recorded in the SmartFile 52 of the video cassette 51, which is output to the D-VHS 5 by the IRD 2. "tape_information_type (tape_position)" of OPERAND 9 indicates that it is a command which requests the recording start position and the recording end position on the tape of the specified TOC within the TOC which is recorded in the SmartFile 52 of the video cassette 51.

When the D-VHS 5 receives an AV/C command such as that shown in FIG. 24, the D-VHS 5 reads the recording start position and the recording end position on the tape of the video cassette 51 of the specified TOC within the TOC which is recorded in the SmartFile 52, and outputs an AV/C response such as that shown in FIG. 25 as a response to the IRD 2. "toc_information_type (tape_position)" of OPERAND 9 indicates that it is an AV/C response which returns the recording start position and the recording end position on the tape of the specified TOC. The recording start position and the recording end position, as shown in FIG. 26, are displayed as the remaining time on each tape in units of minutes.

Figures 26, 27:
FIG. 26 is a diagram illustrating the recording start position and the recording end position of the TOC on the cassette tape.
FIG. 27 is a diagram showing an AV/C command which requests the title of a specified TOC.

FIG. 27 shows an example of an AV/C command which reads the title of a specified TOC within the TOC which is recorded in the SmartFile 52 of the video cassette 51, which is output to the D-VHS 5 by the IRD 2. "toc_information_ type (program_title)" of OPERAND 9 indicates that it is a command which requests the title of the TOC to be specified within the TOC which is recorded in the SmartFile 52 of the video cassette 51.

When the D-VHS 5 receives an AV/C command such as that shown in FIG. 27, the D-VHS 5 reads the title of the specified TOC within the TOC which is recorded in the SmartFile 52, and outputs an AV/C response such as that shown in FIG. 28 as a response to the IRD 2. "toc_information type (program_title)" of OPERAND 9 indicates that it is an AV/C response which returns the title of the specified TOC. It is shown that data of the title is stored in the "program_title" of OPERANDS 10 to 38.

FIG. 29 shows an example of an AV/C command which reads the genre code of a specified TOC within the TOC which is recorded in the SmartFile 52 of the video cassette 51, which is output to the D-VHS 5 by the IRD 2. "toc_information_type (program_genre)" of OPERAND 9 indicates that it is a command which requests the genre code of the TOC to be specified within the TOC which is recorded in the SmartFile 52 of the video cassette 51.

When the D-VHS 5 receives an AV/C command such as that shown in FIG. 29, the D-VHS 5 reads the genre code of the specified TOC within the TOC which is recorded in the SmartFile 52, and outputs an AV/C response such as that shown in FIG. 30 as a response to the IRD 2. "toc_information_type (program_genre)" of OPERAND 9 indicates that it is an AV/C response which returns the genre code of the specified TOC. In the "genre" of OPERAND 10, the genre code is stored.

FIG. 31 shows an example of an AV/C command which reads permission of overwriting on a specified TOC, a recording mode, an input source, a running speed, a recording signal format, and audio information, within the TOC which is recorded in the SmartFile 52 of the video cassette 51, which is output to the D-VHS 5 by the IRD 2. "toc_information_type (recording_info.)" of OPERAND 9 indicates that it is a command which requests permission of overwriting on a TOC to be specified, a recording mode, an input source, a running speed, a recording signal format, and audio information, within the TOC which is recorded in the SmartFile 52 of the video cassette 51.

When the D-VHS 5 receives an AV/C command such as that shown in FIG. 31, the D-VHS 5 reads permission of overwriting on the specified TOC, a recording mode, an input source, a running speed, a recording signal format, and audio information, within the TOC which is recorded in the SmartFile 52, and outputs an AV/C response such as that shown in FIG. 32 as a response to the IRD 2. "toc_information_type (recording_info.)" of OPERAND 9 indicates that it is an AV/C response which returns permission of overwriting on the specified TOC, a recording mode, an input source, a running speed, a recording signal format, and audio information.

FIG. 33 shows an example of an AV/C command which reads the provider name of a specified TOC within the TOC which is recorded in the SmartFile 52 of the video cassette 51, which is output to the D-VHS 5 by the IRD 2. "toc_information type (provider_name)" of OPERAND 9 indicates that it is a command which requests the provider name of the TOC to be specified within the TOC which is recorded in the SmartFile 52 of the video cassette 51.

When the D-VHS 5 receives an AV/C command such as that shown in FIG. 33, the D-VHS 5 reads the provider name of the specified TOC within the TOC which is recorded in the SmartFile 52, and outputs an AV/C response such as that shown in FIG. 34 as a response to the IRD 2. "toc_information_type (provider_name)" of OPERAND 9 indicates that it is an AV/C response which returns the provider name of the specified TOC. It is shown that in OPERANDS 10 to 20, the provider name is recorded as data.

FIG. 35 shows an example of an AV/C command which reads the provider information (channel at the time of reception) of a specified TOC within the TOC which is recorded in the SmartFile 52 of the video cassette 51, which is output to the D-VHS 5 by the IRD 2. "toc_information_type (provider_info.)" of OPERAND 9 indicates that it is a command which requests the provider information of the TOC to be specified within the TOC which is recorded in the SmartFile 52 of the video cassette 51.

When the D-VHS 5 receives an AV/C command such as that shown in FIG. 35, the D-VHS 5 reads the provider information of the specified TOC within the TOC which is recorded in the SmartFile 52, and outputs an AV/C response such as that shown in FIG. 36 as a response to the IRD 2. "toc_information_type (provider_info.)" of OPERAND 9 indicates that it is an AV/C response which returns the provider information of the specified TOC.

FIG. 37 shows an example of an AV/C command which instructs the start-locating of a specified TOC within the TOC which is recorded in the SmartFile 52 of the video cassette 51. "Smart_File_Search" of OPERAND 7 indicates that it is a command which requests the start-locating of the TOC to be specified as "toc_number" of OPERAND 8.

When the AV/C command response processing section 41 of the microcomputer 32 of the D-VHS 5 receives an AV/C command such as that shown in FIG. 37, the AV/C command response processing section 41 causes the tape-running-system control section 44 to control the tape running control device 36 on the basis of the SmartFile stored in the memory 33 so as to output an instruction for performing start-locating. The AV/C command response processing section 41 returns an "interim" signal as an AV/C response to the IRD 2 while the tape running control device 36 is performing start-locating. Then, when the tape running control device 36 detects the completion of the start-locating via the magnetic head 37, the tape-running-system control section 44 sends that information to the AV/C command response processing section 41, and based on this information, the AV/C command response processing section 41 returns a signal indicating "accepted" to the IRD 2.

FIG. 38 shows an example of an AV/C command which instructs the start-locating of the longest blank portion on the basis of the SmartFile recorded in the SmartFile 52 of the video cassette 51, which is output to the D-VHS 5 by the IRD 2. "Smart_File_Search" of OPERAND 7 indicates that it is a command which requests the start-locating of a blank to be specified as a blank of OPERAND 8.

When the AV/C command response processing section 41 of the microcomputer 32 of the D-VHS 5 receives an AV/C command such as that shown in FIG. 38, the AV/C command response processing section 41 outputs an instruction to the tape-running-system control section 44 so that the tape-running-system control section 44 controls the tape running control device 36 on the basis of the SmartFile stored in the memory 33, which is read by the SmartFile information access section 42 in order to instruct the start-locating of the longest blank portion. The AV/C command response processing section 41 returns an "interim" signal as an AV/C response to the IRD 2 while the tape running control device 36 is performing start-locating. Then, when the tape running control device 36 detects the completion of the start-locating via the magnetic head 37, the tape-running-system control section 44 sends that information to the AV/C command response processing section 41, and based on this information, the AV/C command response processing section 41 returns a signal indicating "accepted" to the IRD 2.

FIG. 39 shows an example of an AV/C command when the D-VHS 5 inquires to the IRD 2 about the additional information in the stream which is being received. "channel_number" of OPERAND 8 indicates a channel number which is being received. "information_type" of OPERAND 9 indicates the type of additional information to be inquired. "information_type-dependent_field" of OPERAND 10 and subsequent OPERANDS indicates information relevant to the type of additional information to be inquired.

The AV/C command of FIG. 39 is transmitted to the IRD 2 by the D-VHS 5 after approximately five minutes have elapsed from when recording is started. The reason for this is that since the IRD 2 cannot read relevant information immediately after the stream is received, after a sufficient time has elapsed from the reception of the stream, the relevant information is transmitted at a timing at which the relevant information is extracted reliably.

Figure 40:
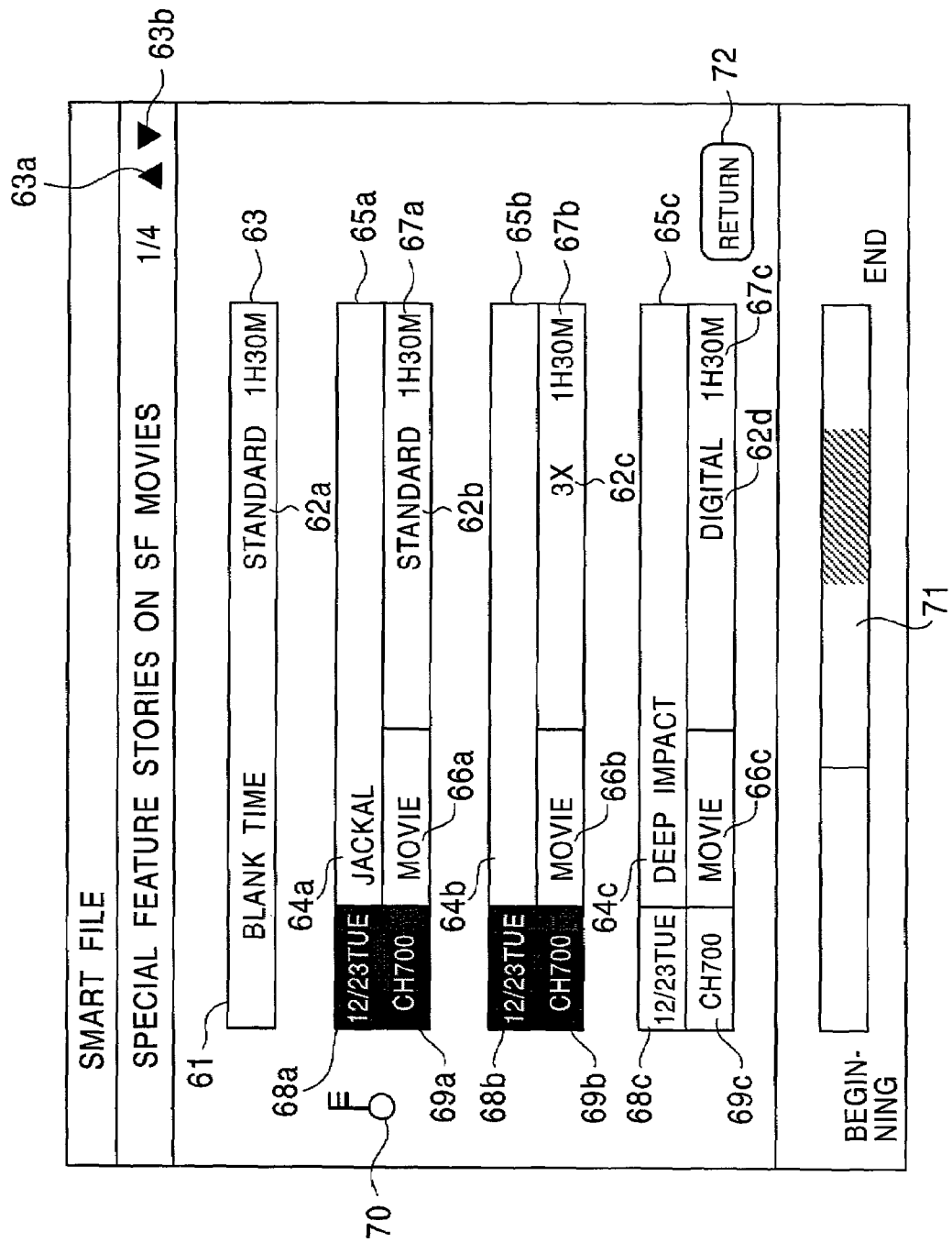
FIG. 40 is a diagram showing an example of a display screen which is displayed on a monitor by the IRD of FIG. 1.

Next, referring to FIG. 40, a display screen in a case where the IRD 2 causes the monitor 3 to display SmartFile information read from the D-VHS 5 is described.

At the topmost part of FIG. 40, there is a blank time display column 61, and in this column, there are a recording mode display column 62a and a recordable time display column 63. In this example, "standard" is displayed in the recording mode display column 62a, and "1H30M" is displayed in the recordable time display column 63 so that the information that recording of one hour and 30 minutes is possible in the standard mode is shown.

Below the blank time display column 61, there is a program display column 64a, and in this example, there are provided a title display column 65a displayed as "Jackal", a genre display column 66a displayed as "movie", a recording mode display column 62a displayed as "standard", a recorded time display column 67a displayed as "1H30M", a date display column 68a displayed as "12/23 TUE", and a channel display column 69a displayed as "CH700". The same applies to program display columns 64b and 64c below the program display column 64a.

By moving the cursor onto these program display columns 64b and 64c, a program is specified. In this example, since only the portions of the date display column 68c and the channel display column 69c are not white against a black background like the date display columns 68a and 68b and the channel display columns 69a and 69b, this shows that "Deep Impact" of the program display column 64c is specified. In this state, when a playback is instructed by operating the operation panel 23 or the remote controller 25, the CPU 20 outputs to the D-VHS 5 an instruction for playing back "Deep Impact".

On the side to the left of the program display column 64a of "Jackal", there is an overwriting prohibition mark 60 so that a program provided with this overwriting prohibition mark 60 will not be erased even if an overwriting (recording) operation is performed.

Below the program display column 64c, there is a tape position display column 71, and the position on the tape of the selected program is displayed. In this example, it is shown that the selected "Deep Impact" is present in the portion displayed in black between the "beginning" and "end" which indicate the entire tape.

When the cursor is moved to a button 72 displayed as "return" and the operation panel 23 or the remote controller 25 is operated, a return is made to a display previous to this display. Furthermore, when the cursor is moved to a button 63a and an operation is performed similarly, the display proceeds to the next screen. When the cursor is moved to a button 63b and an operation is performed similarly, the display returns to the previous screen in a manner similar to that for the button 62.

Next, referring to FIGS. 41 to 44, a description is given of the operation of the IRD 2 when the TOC recorded in the video cassette 51 which is loaded into the D-VHS 5 is read by operating the operation panel 23 or the remote controller 25 of the IRD 2. In this example, a description is given of a case in which only the information of the recording start date within the information of the TOC is read.

Figure 41:
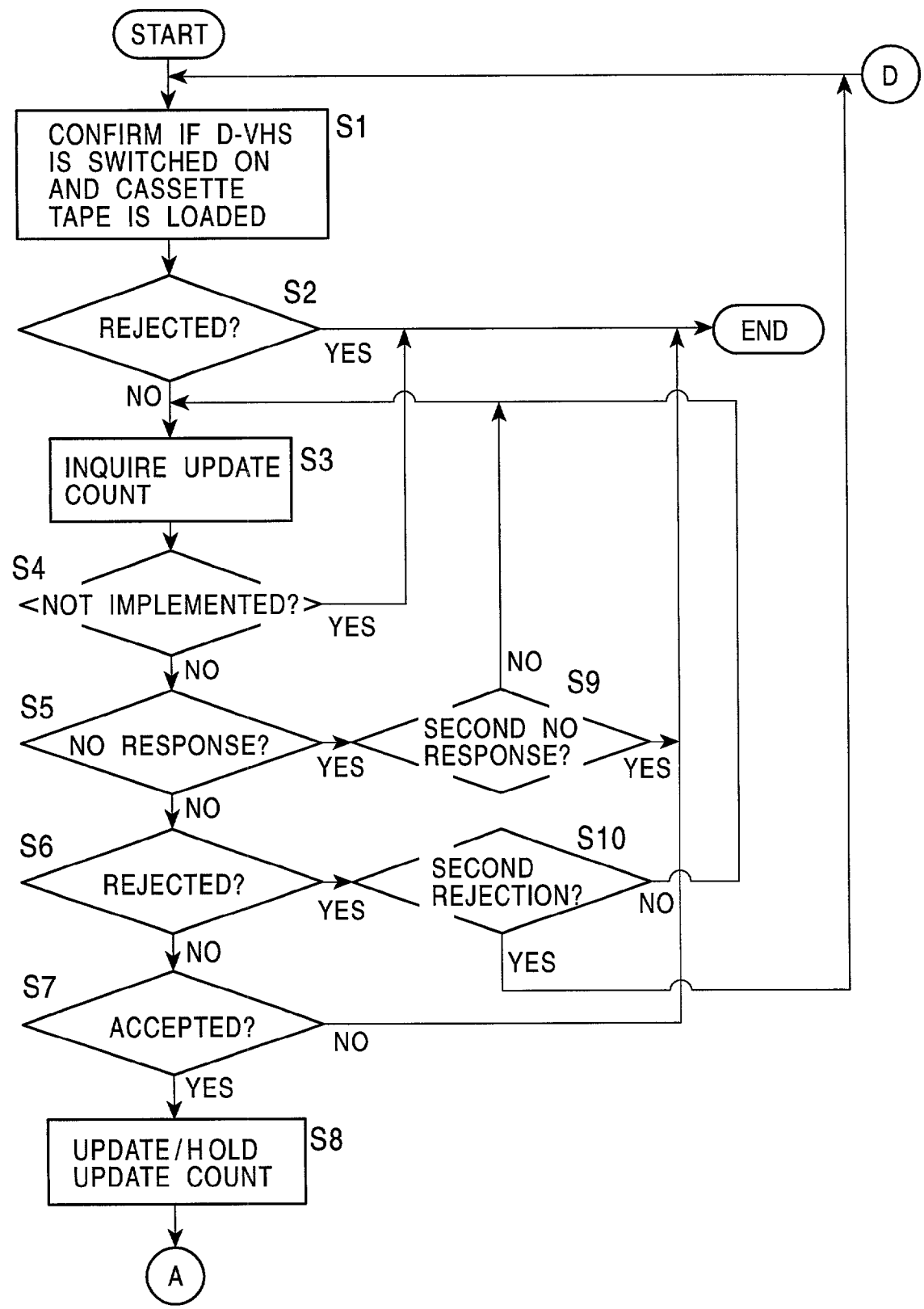
FIG. 41 is a flowchart illustrating the operation when the IRD reads the TOC.

When the user operates the operation panel 23 or the remote controller 25 so as to instruct a display such as that shown in FIG. 41, processing is started.

In step S1, the CPU 20 of the IRD 2 outputs to the D-VHS 5 a command for confirming that the D-VHS 5 is switched on and the video cassette 51 is loaded, and waits for a response for this to be received.

In step S2, the CPU 20 of the IRD 2 determines whether or not the D-VHS 5 is switched on and the video cassette 51 is loaded on the basis of a response from the D-VHS 5. When it is determined in step S2 that the D-VHS 5 is switched off and the video cassette 51 is not loaded, the processing is terminated. When it is determined in step S2 that the D-VHS 5 is switched on and the video cassette 51 is loaded, the process proceeds to step S3.

Figure 45:
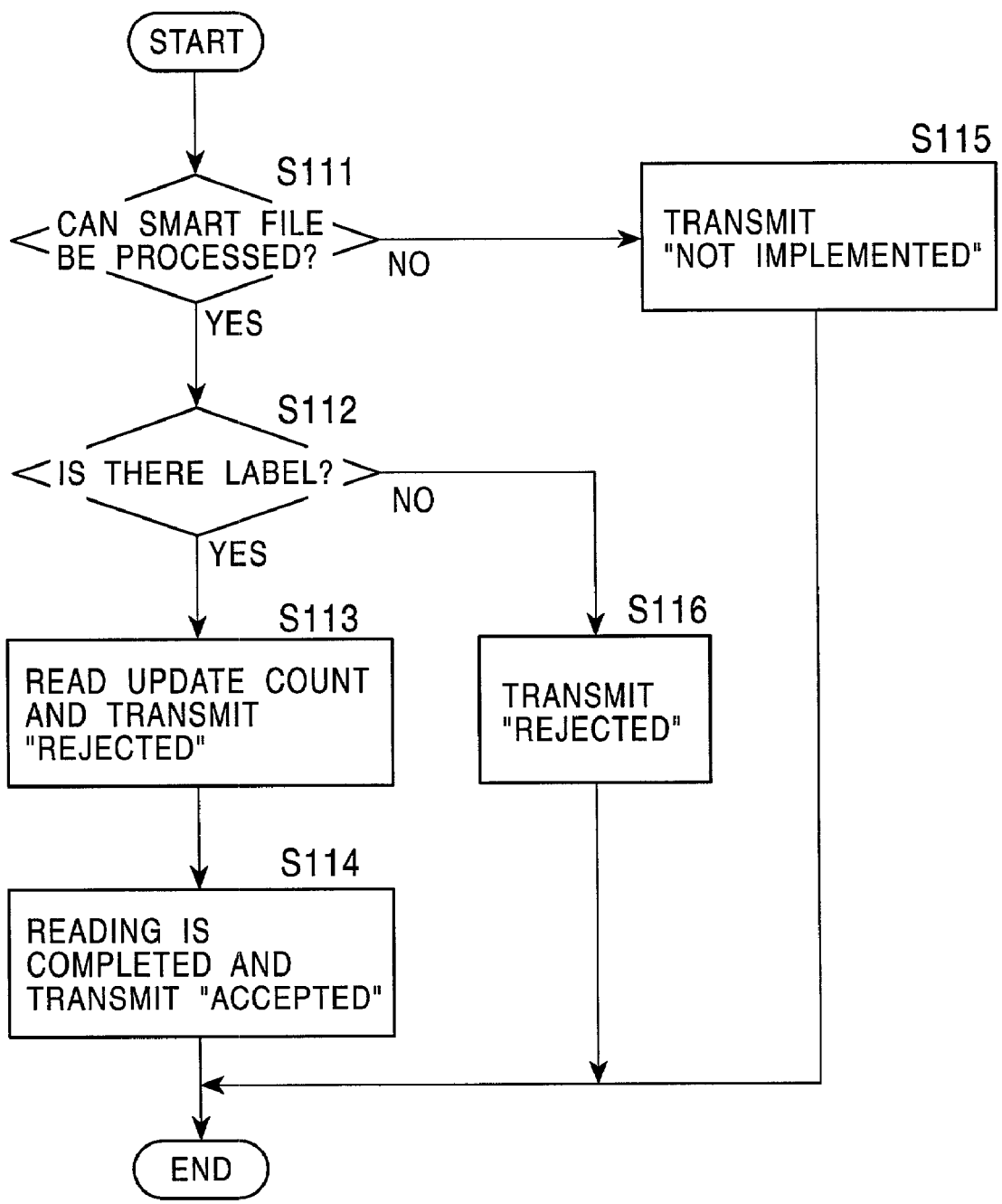
FIG. 45 is a flowchart illustrating the operation when the IRD reads the TOC.

In step S3, the CPU 20 transmits an AV/C command of FIG. 16 to the D-VHS 5 in order to inquire as to the number of updates. Here, referring to the flowchart in FIG. 45, the processing of the D-VHS 5 when the AV/C command which inquires as to the number of updates is received is described.

The AV/C command response processing section 41 of the microcomputer 32 of the D-VHS 5 starts processing when the AV/C command of FIG. 16 is received from the CPU 20 of the IRD 2. In step S1111, it is determined whether or not the SmartFile can be processed. This is a process for dealing with a D-VHS 5 such as that which does not have a SmartFile information access section 42. Therefore, in this example, since a SmartFile can be processed, the process proceeds to step S112.

In step S112, the AV/C command response processing section 41 causes the SmartFile information access section 42 to determine whether or not the SmartFile 52 is affixed to the loaded video cassette 51. The SmartFile information access section 42 outputs an instruction to the SmartFile R/W control section 43, and based on this instruction, the SmartFile R/W control section 43 controls the SmartFile element R/W device 34 in order to detect the presence or absence of the SmartFile 52. Then, the SmartFile element R/W device 34 outputs the detection result to the SmartFile R/W control section 43, and based on the result from the SmartFile R/W control section 43, the AV/C command response processing section 41 determines the presence or absence of the SmartFile 52. In this example, since the SmartFile is affixed, the process proceeds to step S113.

In step S113, the AV/C command response processing section 41 causes the SmartFile information access section 42 to read the number of updates, and returns "rejected" to the IRD 2 until the response thereto occurs. The SmartFile information access section 42 reads the number of updates stored in the memory 33 and outputs it to the AV/C command response processing section 41.

In step S114, the AV/C command response processing section 41 outputs to the IRD 2 the signal indicating "rejected" together with the AV/C response of FIG. 17 which shows the read number of updates, and processing is terminated.

When it is determined in step S111 that the SmartFile cannot be processed, that is, when the SmartFile information access section 42, the SmartFile R/W control section 43, etc., are not provided, the process proceeds to step S115, whereby the AV/C command response processing section 41 outputs a signal indicating "not implemented" to the IRD 2, and processing is terminated.

When it is determined in step S112 that the SmartFile 52 is not affixed, the process proceeds to step S116, whereby the AV/C command response processing section 41 outputs a signal indicating "rejected" to the IRD 2, and processing is terminated.

Then, in step S3 (see FIG. 41), the CPU 20 waits for a particular time period (approximately 100 milliseconds) for an AV/C response from the D-VHS 5 to be received.

In step S4, the CPU 20 determines whether or not the received AV/C response is "not implemented". In this example, since the received AV/C response is "accepted", it is determined that the response is not "not implemented", and the process proceeds to step S5.

In step 5, the CPU 20 determines whether or not an AV/C response has occurred. In this example, since an AV/C response of "accepted" has occurred, it is determined that the state is not "no AV/C response", and the process proceeds to step S6.

In step S6, the CPU 20 determines whether or not the AV/C response is "rejected". In this example, since the AV/C response is "accepted", it is determined that the response is not "rejected", and the process proceeds to step S7.

In step S7, the CPU 20 determines whether or not the AV/C response is "accepted". In this example, since the AV/C response is "accepted", the process proceeds to step S8.

Figure 42:
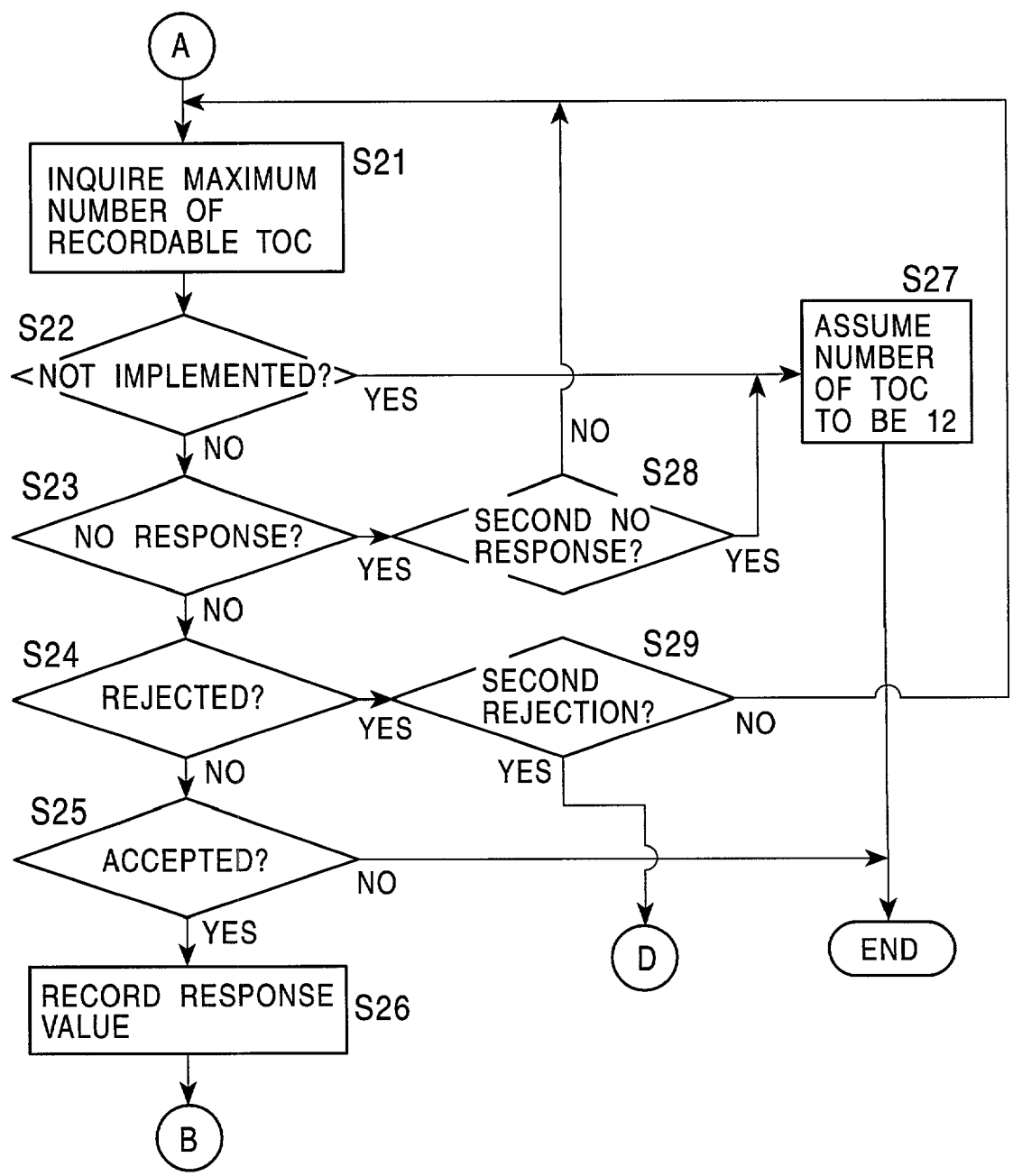
FIG. 42 is a flowchart illustrating the operation when the D-VHS reads the number of updates.

In step S8, the CPU 20 receives an AV/C response such as that shown in FIG. 17, and based on this response, updates the data of the number of updates, which is recorded in the RAM 21, and the process proceeds to step S21 (see FIG. 42).

When it is determined in step S4 that the response is "not implemented", the CPU 20 assumes that the D-VHS 5 has no function for processing a SmartFile, and processing is terminated.

When it is determined in step S5 that there is no AV/C response, the process proceeds to step S9, whereby it is determined whether or not the determination of "no AV/C response" has occurred a second time. When it is determined that the determination of "no AV/C response" has not occurred a second time, the process returns to step S3, and processing of step S3 and subsequent steps is repeated. When it is determined in step S9 that the determination of "no response" has occurred a second time, processing is terminated. That is, when the state of "no response" continues two times, the CPU 20 assumes that the D-VHS 5 has no function for processing a SmartFile, and processing is terminated.

When it is determined in step S6 that the AV/C response is "rejected", the process returns to step S10, whereby it is determined whether or not the AV/C response of "rejected" has occurred a second time. When it is determined in step S10 that the response of "rejected" has not occurred a second time, the process returns to step S3, and processing of step S3 and subsequent steps is repeated. When it is determined in step S10 that the response of "rejected" is occurring a second time, the process returns to step S1, and processing of step S1 and subsequent steps is repeated.

The description now turns to the process of step S21 (see FIG. 42).

In step S21, the CPU 20 of the IRD 2 outputs an AV/C command shown in FIG. 12 to the D-VHS 5 in order to inquire as to the maximum number of recordable TOC and waits for a response to be received.

Figure 46:
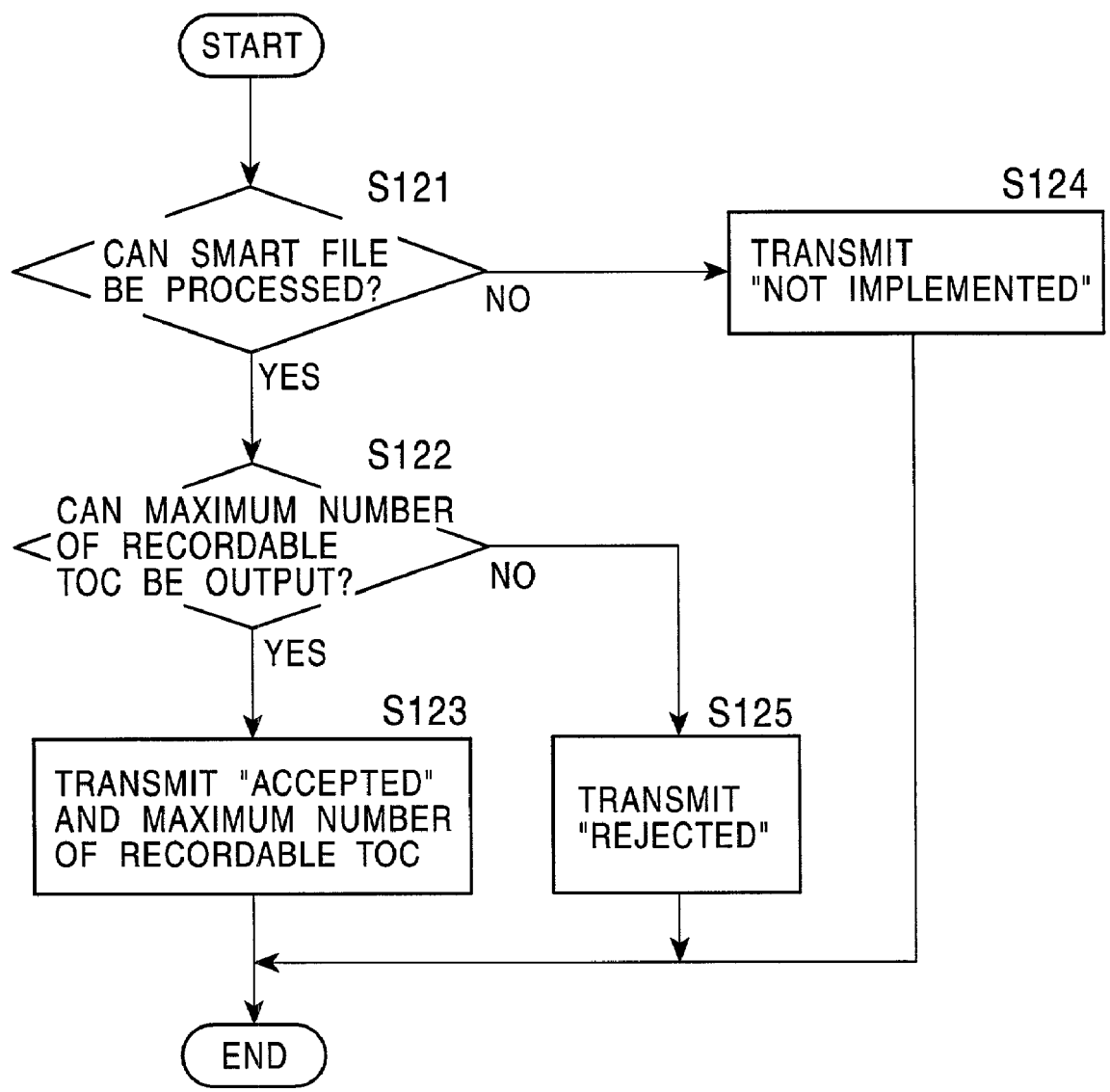
FIG. 46 is a flowchart illustrating the operation when the D-VHS reads the number of the recordable TOC.

Here, referring to the flowchart in FIG. 46, the process of the D-VHS 5 when the AV/C command of FIG. 12 is received is described. When the AV/C command response processing section 41 of the microcomputer 32 of the D-VHS 5 receives the AV/C command of FIG. 12 from the CPU 20 of the IRD 2, the AV/C command response processing section 41 starts processing. In step S121, it is determined whether or not the SmartFile can be processed. In this example, since the SmartFile can be processed, the process proceeds to step S122.

In step S122, the AV/C command response processing section 41 causes the SmartFile information access section 42 to detect the maximum number of recordable TOC. The SmartFile information access section 42 detects the number of recordable TOC which is recorded in the memory 33 and outputs it to the AV/C command response processing section 41. Based on this response, the AV/C command response processing section 41 determines whether or not the maximum number of recordable TOC can be output. In this example, since the maximum number of recordable TOC can be detected and output, the process proceeds to step S123.

In step S123, the AV/C command response processing section 41 outputs to the IRD 2 a signal indicating "accepted" together with the AV/C response which shows the maximum number of recordable TOC in FIG. 13 from the SmartFile information access section 42, and processing is terminated.

When it is determined in step S121 that the SmartFile cannot be processed, the process proceeds to step S124, whereby the AV/C command response processing section 41 outputs a signal indicating "not implemented" to the IRD 2, and processing is terminated.

When it is determined in step S122 that the maximum number of recordable TOC cannot be detected for some trouble, the process proceeds to step S125.

In step S125, the AV/C command response processing section 41 returns "rejected" to the IRD 2, and processing is terminated.

The description now turns to the process of step S21 (see FIG. 42).

In step S21, the CPU 20 waits for a particular time period (approximately 100 milliseconds) for an AV/C response from the D-VHS 5 to be received, and the process proceeds to step S22.

In step S22, the CPU 20 determines whether or not the received AV/C response is "not implemented". In this example, since the response is "accepted", it is determined that the response is not "not implemented", and the process proceeds to step S23.

In step S23, the CPU 20 determines whether or not the AV/C response has occurred. In this example, since the AV/C response of "accepted" has occurred, it is determined that the state is not "no response", and the process proceeds to step S24.

In step S24, the CPU 20 determines whether or not the AV/C response is "rejected". In this example, since the response is "accepted", it is determined that the response is not "rejected", and the process proceeds to step S25.

In step S25, the CPU 20 determines whether or not the AV/C response is "accepted". In this example, since the response is "accepted", the process proceeds to step S26.

In step S26, the CPU 20 receives an AV/C response such as that shown in FIG. 13. Based on this response, the data of the maximum number of recordable TOC, which is recorded in the RAM 21, is recorded, and the process proceeds to step S41 (see FIG. 43).

When it is determined in step S22 that the response is "not implemented", the CPU 20 sets the maximum number which can be recorded in the video cassette 51 to be 12 and records it in the RAM 21, and processing is terminated.

When it is determined in step S23 that the AV/C response has not occurred, the process proceeds to step S28, whereby the CPU 20 determines whether or not the determination of "no AV/C response" has occurred a second time. When it is determined that the determination of "no AV/C response" has not occurred a second time, the process returns to step S21, and processing of step S21 and subsequent steps is repeated. When it is determined in step S28 that the determination of "no AV/C response" has occurred a second time, the process returns to step S27, and processing of step S27 and subsequent steps is repeated.

When it is determined in step S24 that the AV/C response is "rejected", the process proceeds to step S29, whereby it is determined whether or not the AV/C response of "rejected" has occurred a second time. When it is determined in step S29 that the AV/C response of "rejected" has not occurred a second time, the process proceeds to step S21, and processing of step S21 and subsequent steps is repeated. When it is determined in step S29 that the AV/C response of "rejected" has occurred a second time, the process returns to step S1 (see FIG. 41), and processing of step S1 and subsequent steps is repeated.

Figure 43:
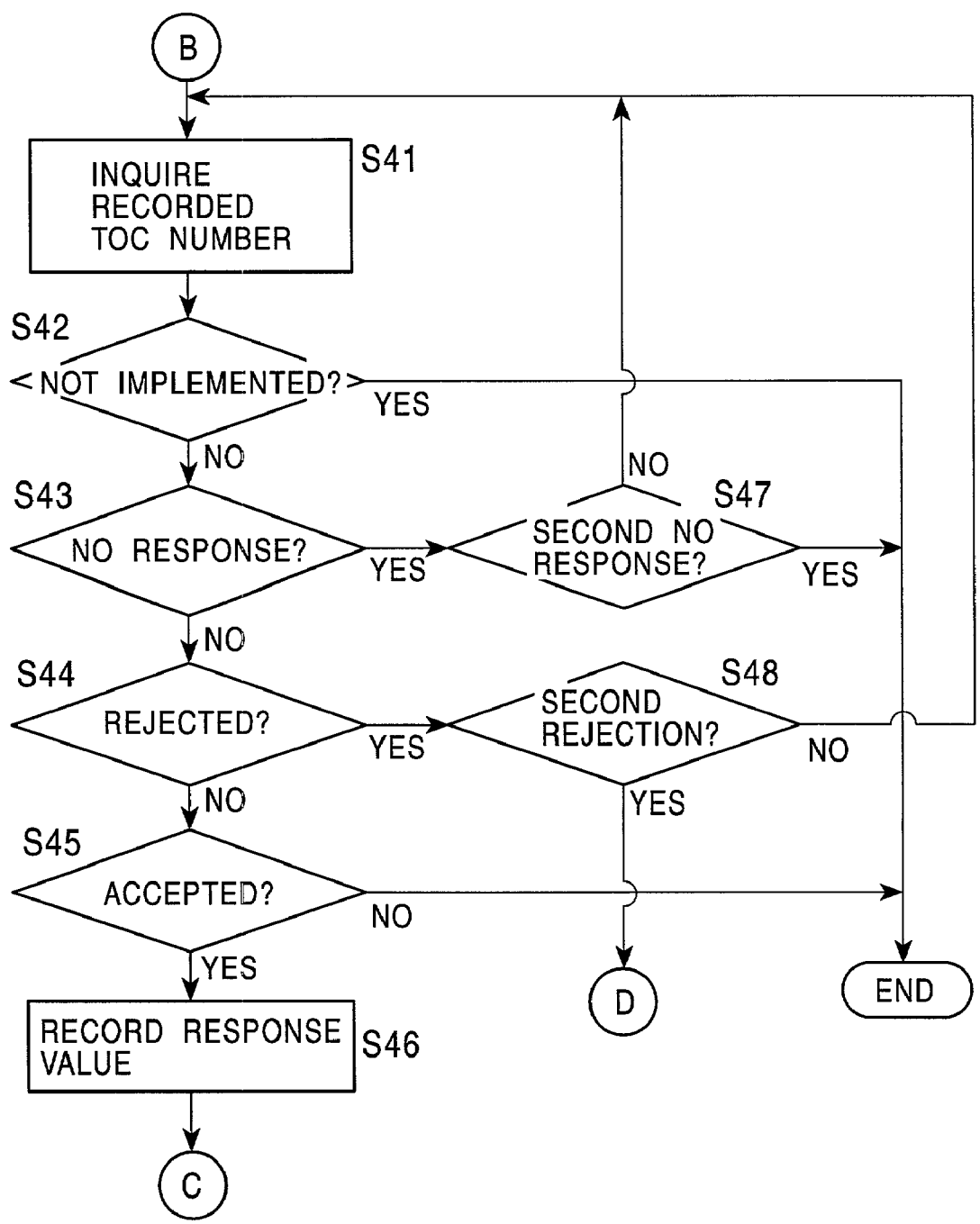
FIG. 43 is a flowchart illustrating the operation when the IRD reads the TOC.

The description now turns to the process of step S41 (see FIG. 43).

In step S41, the CPU 20 of the IRD 2 outputs the AV/C command shown in FIG. 14 to the D-VHS 5 in order to inquire as to the recorded TOC number, and waits for a particular time period (approximately 100 milliseconds) for a response to be received.

Figure 47:
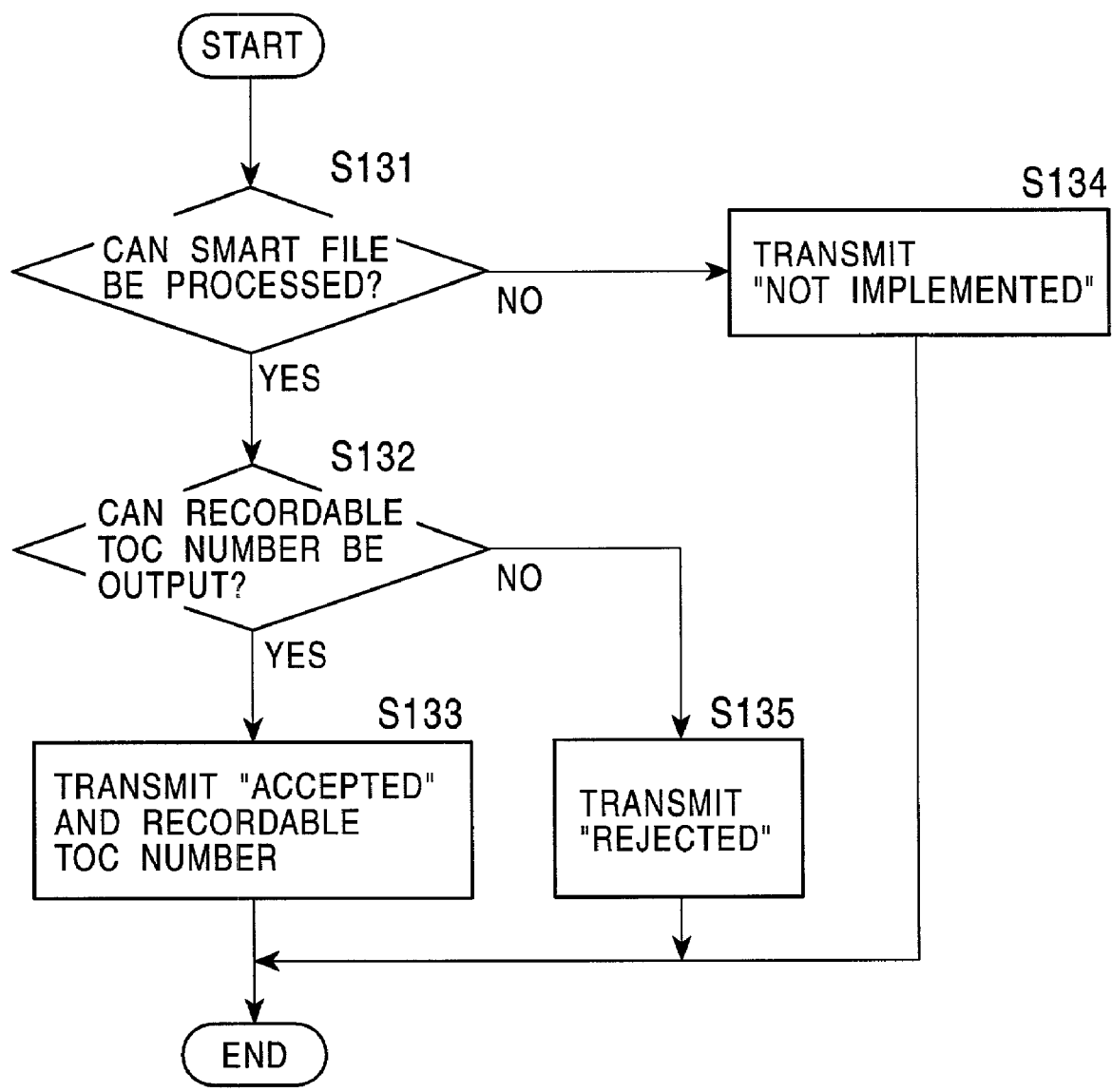
FIG. 47 is a flowchart illustrating the operation when the IRD reads the TOC.

Here, referring to the flowchart in FIG. 47, the processing of the D-VHS 5 when the AV/C command shown in FIG. 14 is received is described. When the AV/C command response processing section 41 of the microcomputer 32 of the D-VHS 5 receives the AV/C command of FIG. 14 from the CPU 20 of the IRD 2, the AV/C command response processing section 41 starts processing. In step S131, it is determined whether or not the SmartFile can be processed. In this example, since the SmartFile can be processed, the process proceeds to step S132.

In step S132, the AV/C command response processing section 41 causes the SmartFile information access section 42 to detect the recorded TOC number. The SmartFile information access section 42 detects the TOC number which is recorded in the memory 33 and outputs it to the AV/C command response processing section 41. Based on this response, the AV/C command response processing section 41 determines whether or not the recorded TOC number can be output. In this example, since the recorded TOC number can be detected and output, the process proceeds to step S133.

In step S133, the AV/C command response processing section 41 outputs a signal indicating "accepted", together with the AV/C response which shows the number of the recorded TOC from the SmartFile information access section 42 in FIG. 15, to the IRD 2, and processing is terminated.

When it is determined in step S131 that the SmartFile cannot be processed, the process proceeds to step S134, whereby the AV/C command response processing section 41 outputs a signal indicating "not implemented" to the IRD 2, and processing is terminated.

When it is determined in step S132 that the number of the recorded TOC cannot be detected for some trouble, the process proceeds to step S135.

In step S135, the AV/C command response processing section 41 returns "rejected" to the IRD 2, and processing is terminated.

The description now turns to the process of step S41 (see FIG. 43).

In step S41, the CPU 20 waits for a particular time period (approximately 100 milliseconds) for an AV/C response from the D-VHS 5 to be received, and the process proceeds to step S42.

In step S42, the CPU 20 determines whether or not the received AV/C response is "not implemented". In this example, since the response is "accepted", it is determined that the response is not "not implemented", and the process proceeds to step S43.

In step S43, the CPU 20 determines whether or not the AV/C response has occurred. In this example, since the AV/C response of "accepted" has occurred, it is determined that the state is not "no response", and the process proceeds to step S44.

In step S44, the CPU 20 determines whether or not the AV/C response is "rejected". In this example, since the response is "accepted", it is determined that the response is not "rejected", and the process proceeds to step S45.

In step S45, the CPU 20 determines whether or not the AV/C response is "accepted". In this example, since the response is "accepted", the process proceeds to step S46.

In step S46, the CPU 20 receives an AV/C response such as that shown in FIG. 15. Based on this response, the data of the number of the recorded TOC, which is recorded in the RAM 21, is recorded, and the process proceeds to step S61 (see FIG. 44).

When it is determined in step S42 that the response is "not implemented", the CPU 20 terminates processing.

When it is determined in step S43 that the AV/C response has not occurred, the process proceeds to step S47, whereby the CPU 20 determines whether or not the determination of "no AV/C response" has occurred a second time. When it is determined that the determination of "no AV/C response" has not occurred a second time, the process returns to step S41, and processing of step S41 and subsequent steps is repeated. When it is determined in step S47 that the determination of "no response" has occurred a second time, processing is terminated.

When it is determined in step S44 that the AV/C response is "rejected", the process proceeds to step S48, whereby it is determined whether or not the determination of the AV/C response of "rejected" has occurred a second time. When it is determined in step S48 that the AV/C response of "rejected" has not occurred a second time, the process returns to step S41, and processing of step S41 and subsequent steps is repeated. When it is determined in step S48 that the AV/C response of "rejected" has occurred a second time, the process returns to step S1 (see FIG. 41), and processing of step S1 and subsequent steps is repeated.

Figure 44:
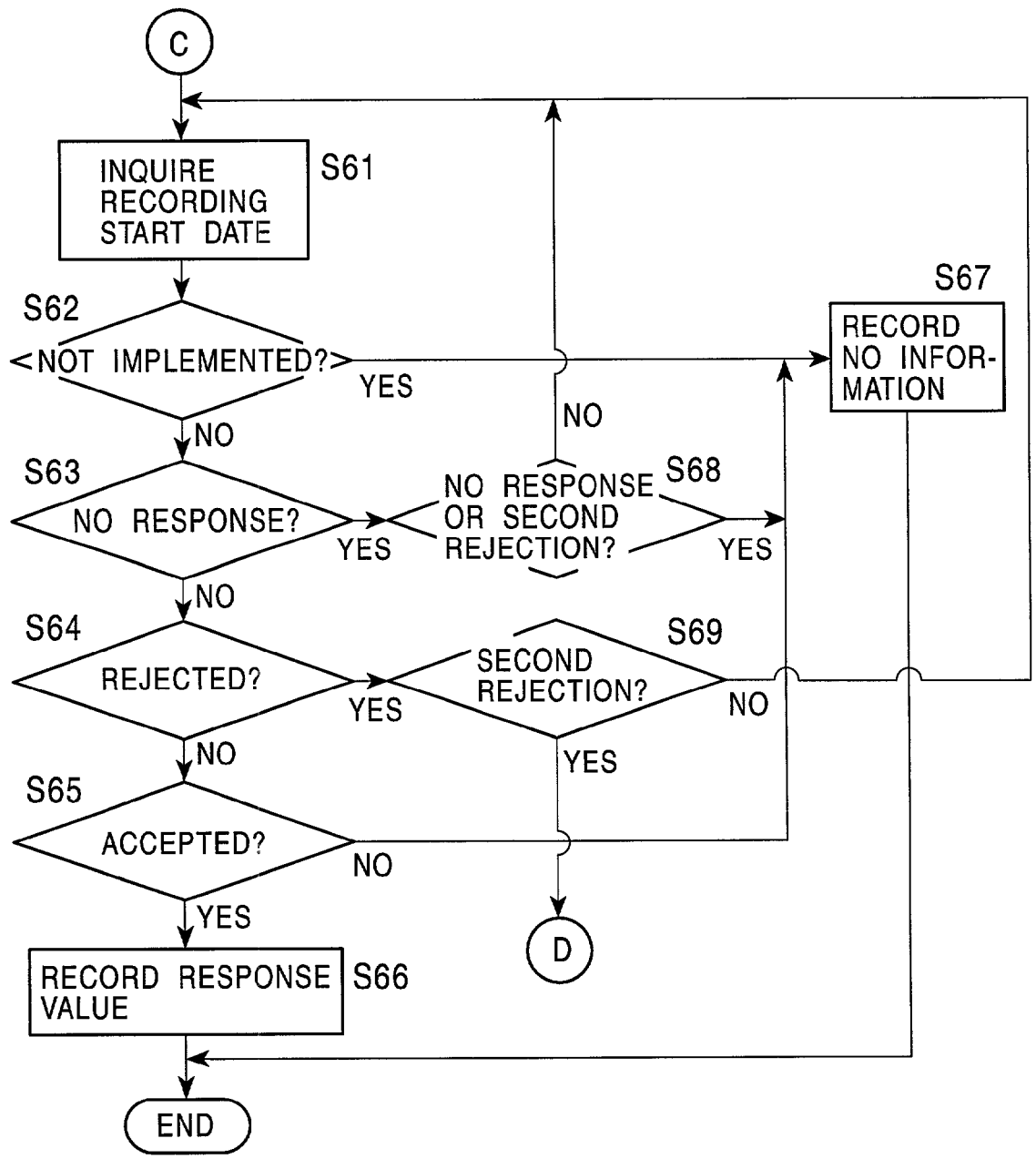
FIG. 44 is a flowchart illustrating the operation when the D-VHS reads the maximum number of recordable TOC.

The description now turns to the process of step S61 (see FIG. 44).

In step S61, the CPU 20 of the IRD 2 outputs the AV/C command shown in FIG. 18 to the D-VHS 5 in order to inquire as to the recording start date of the specified TOC, and waits for a particular time period (approximately 100 milliseconds) for a response to be received.

Figure 48:
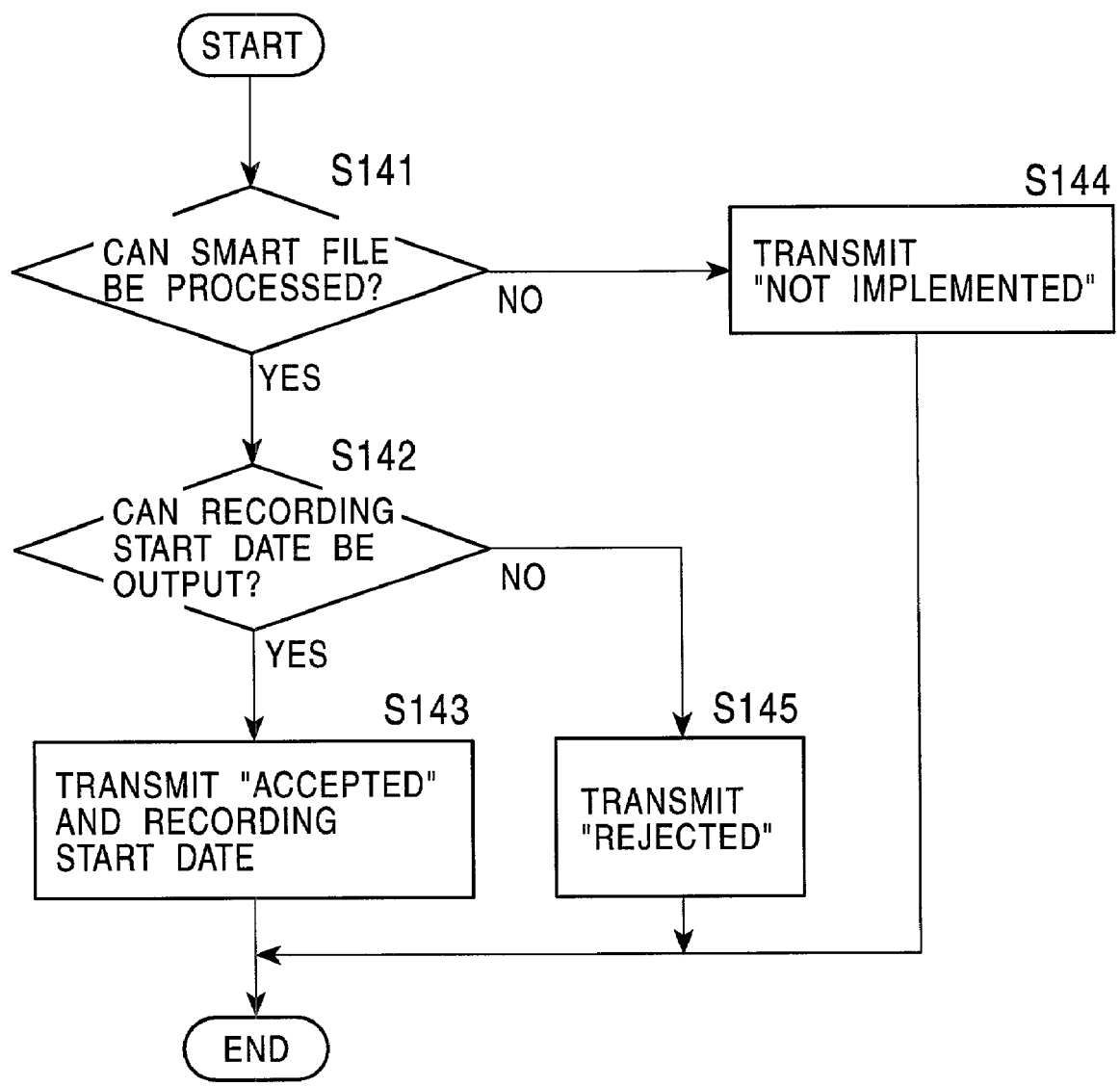
FIG. 48 is a flowchart illustrating the operation when the D-VHS reads the recording start date.

Here, referring to the flowchart in FIG. 48, the processing of the D-VHS 5 when the AV/C command shown in FIG. 18 is received is described. When the AV/C command response processing section 41 of the microcomputer 32 of the D-VHS 5 receives the AV/C command of FIG. 18 from the CPU 20 of the IRD 2, the AV/C command response processing section 41 starts processing. In step S141, it is determined whether or not the SmartFile can be processed. In this example, since the SmartFile can be processed, the process proceeds to step S142.

In step S142, the AV/C command response processing section 41 causes the SmartFile information access section 42 to detect the recording start date which is recorded. The SmartFile information access section 42 detects the recording start date which is recorded in the memory 33 and outputs it to the AV/C command response processing section 41. Based on this response, the AV/C command response processing section 41 determines whether or not the recording start date of the TOC which is recorded can be output. In this example, since it is assumed that the recording start date which is recorded can be detected and output, the process proceeds to step S143.

In step S143, the AV/C command response processing section 41 outputs to the IRD 2 a signal indicating "accepted", together with the AV/C response which shows in FIG. 19 the recording start date from the SmartFile information access section 42 which is recorded, and processing is terminated.

When it is determined in step S141 that the SmartFile cannot be processed, the process proceeds to step S144, whereby the AV/C command response processing section 41 outputs a signal indicating "not implemented" to the IRD 2, and processing is terminated.

When it is determined in step S142 that the recording start date of the recorded TOC cannot be detected for some trouble, the process proceeds to step S145.

In step S145, the AV/C command response processing section 41 returns "rejected" to the IRD 2, and processing is terminated.

The description now turns to the process of step S61 (see FIG. 47).

In step S61, the CPU 20 waits for a particular time period (approximately 100 milliseconds) for an AV/C response from the D-VHS 5 to be received, and the process proceeds to step S62.

In step S62, the CPU 20 determines whether or not the received AV/C response is "not implemented". In this example, since the response is "accepted", it is determined that the response is not "not implemented", and the process proceeds to step S63.

In step S63, the CPU 20 determines whether or not the AV/C response has occurred. In this example, since the AV/C response of "accepted" has occurred, it is determined that the state is not "no response", and the process proceeds to step S64.

In step S64, the CPU 20 determines whether or not the AV/C response is "rejected". In this example, since the response is "accepted", it is determined that the response is not "rejected", and the process proceeds to step S65.

In step S65, the CPU 20 determines whether or not the AV/C response is "accepted". In this example, since the response is "accepted", the process proceeds to step S66.

In step S66, the CPU 20 receives an AV/C response such as that shown in FIG. 7. Based on this response, the data of the recording start date of the TOC, which is recorded in the RAM 21, is recorded, and processing is terminated.

When it is determined in step S62 that the response is "not implemented", the CPU 20 proceeds to step S67.

In step S67, the CPU 20 records the data of the recording start date of the TOC, which is recorded in the RAM 21, as "no information", and processing is terminated.

When it is determined in step S63 that the AV/C response has not occurred, the process proceeds to step S68, whereby the CPU 20 determines whether or not the determination of "no AV/C response" has occurred a second time. When it is determined that the determination of "no AV/C response" has not occurred a second time, the process returns to step S41, and processing of step S41 and subsequent steps is repeated. When it is determined in step S68 that the determination of "no response" has occurred a second time, processing is terminated.

When it is determined in step S64 that the AV/C response is "rejected", the process proceeds to step S69, whereby it is determined whether or not the AV/C response of "rejected" has occurred a second time. When it is determined in step S69 that the AV/C response of "rejected" has not occurred a second time, the process returns to step S61, and processing of step S61 and subsequent steps is repeated. When it is determined in step S69 that the AV/C response of "rejected" has occurred a second time, the process returns to step S1 (see FIG. 41) and processing of step S1, and subsequent steps is repeated.

Although in this example a process of inquiring as to the recording start date has been described, this process may be performed by a similar process in such a way that the length of the video cassette 51, the title of the video cassette 51, the recording start date of the video cassette 51, the recording start time of a specified TOC, the length thereof, the position of the cassette tape, a program title, a program genre, the running speed of the video cassette 51, the recording mode, the provider name, a channel number, etc., are read.

Figure 49:
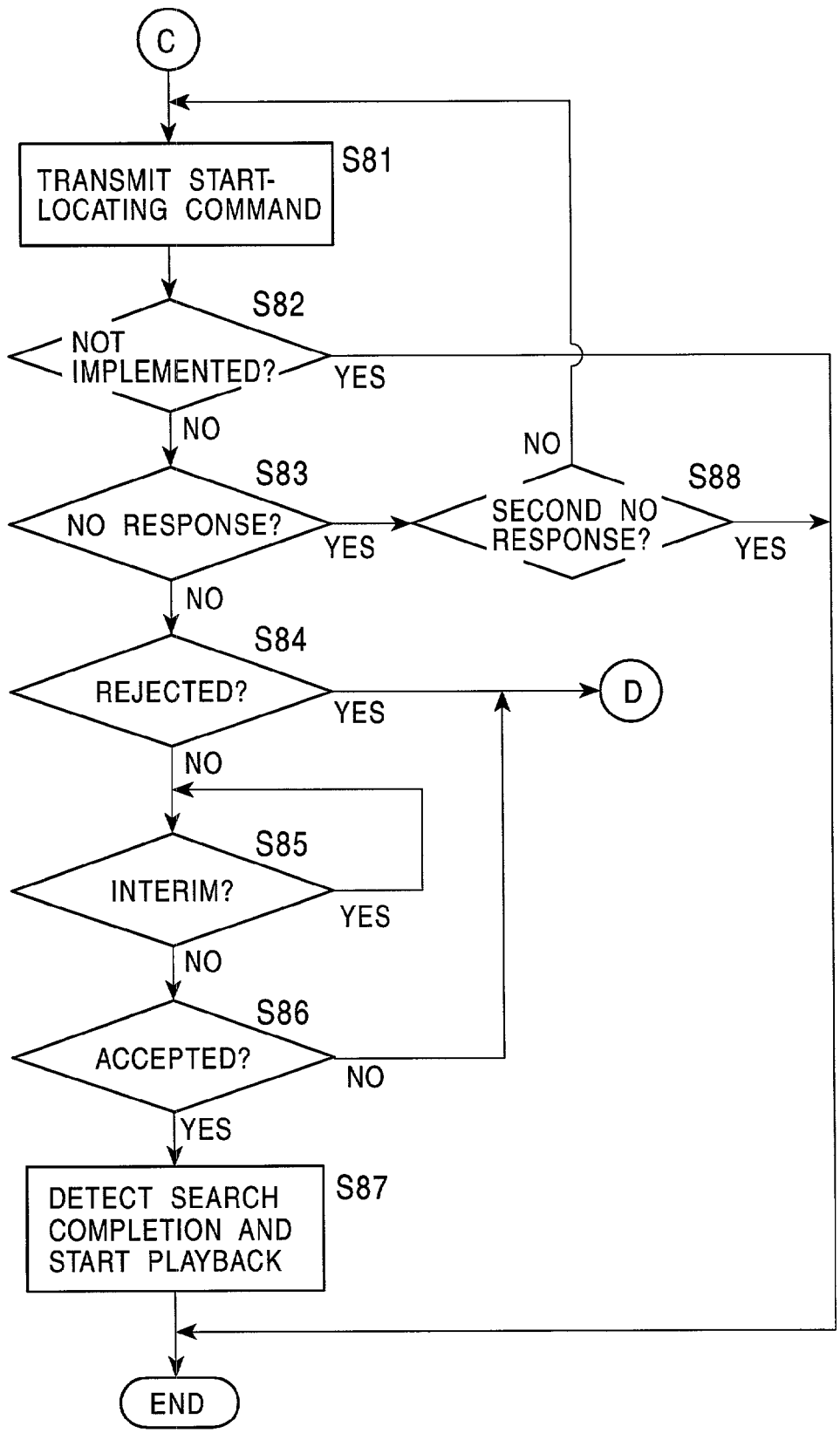
FIG. 49 is a flowchart illustrating the operation when the IRD requests start-locating of the TOC and a playback.

Next, referring to the flowchart in FIG. 49, a description is given of an operation when the IRD 2 outputs an AV/C response for locating the start and performing playback, such as that shown in FIG. 37, to the D-VHS 5. Since the start-locating and playback operation of the IRD 2 and the D-VHS 5 is the same as that for the process from the above-described steps S1 (see FIG. 41) to S46 (see FIG. 43), descriptions thereof are omitted, and a process from step S46 and subsequent steps is described.

After the process of step S46, in step S81, the IRD 2 transmits an AV/C command such as that shown in FIG. 37 to the D-VHS 5 in order to send an instruction of start-locating, and waits for a particular time period (approximately 100 milliseconds) for an AV/C response from the D-VHS 5 to be received, and the process proceeds to step S82.

Figure 50:
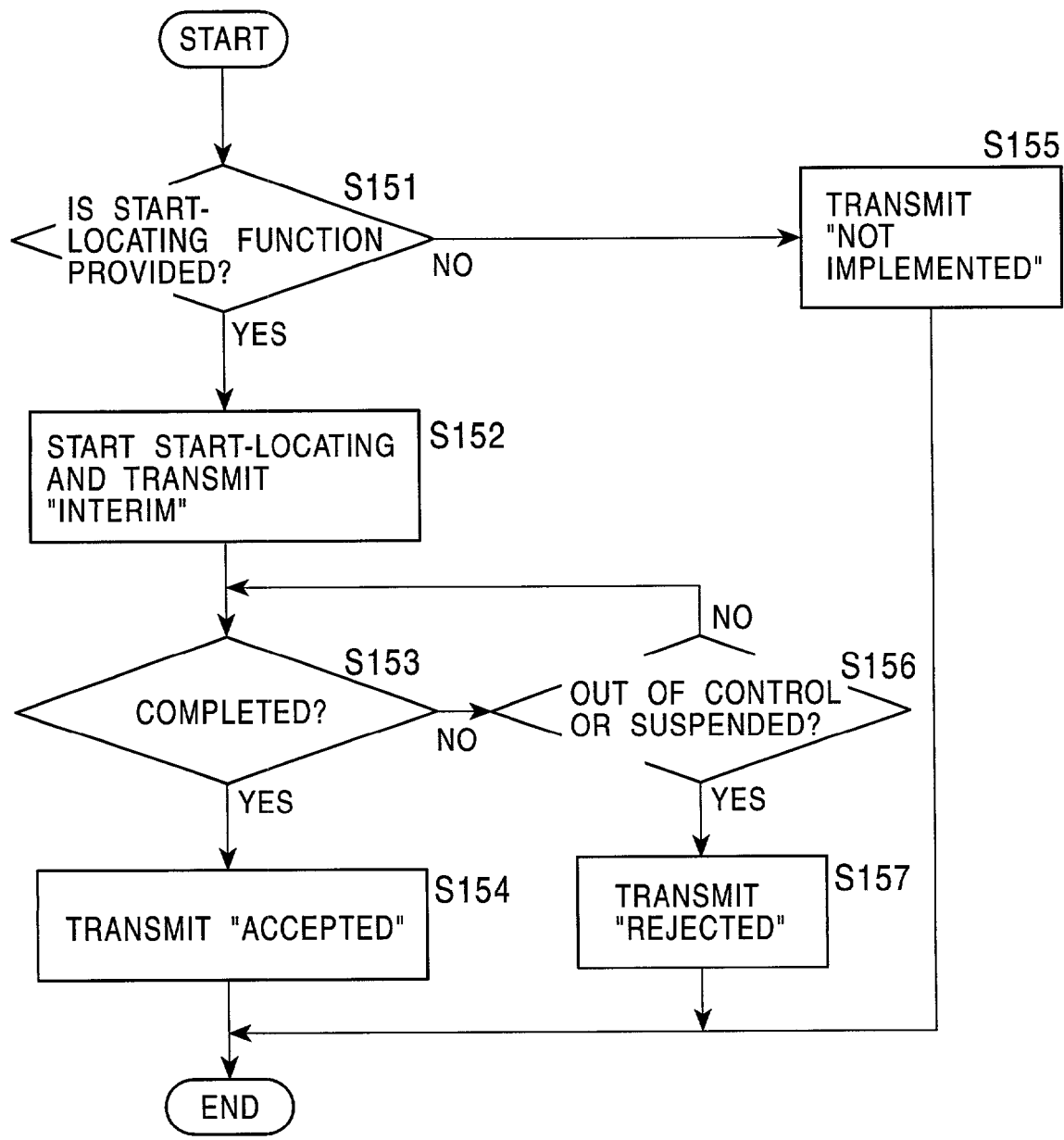
FIG. 50 is a flowchart illustrating the operation when the D-VHS locates the start of the TOC and performs a playback.

Here, referring to the flowchart in FIG. 50, the processing of the D-VHS 5 when the AV/C response of FIG. 37 is received is described. When the AV/C command response processing section 41 of the microcomputer 32 of the D-VHS 5 receives the AV/C response which instructs start-locating of FIG. 37 from the CPU 20 of the IRD 2, the AV/C command response processing section 41 starts processing. In step S151, it is determined whether or not the SmartFile can be processed (whether or not the function for start-locating is provided). In this example, since the start-locating function is provided, the process proceeds to step S152.

In step S152, the AV/C command response processing section 41 instructs the tape-running-system control section 44 to perform start-locating on the basis of the information of the tape position read from the memory 33 by the SmartFile information access section 42, and outputs a signal indicating "interim" to the IRD 2. The tape-running-system control section 44 controls the tape running control device 36 in order to continue the start-locating process.

In step S153, the AV/C command response processing section 41 inquires the tape-running-system control section 44 as to whether or not the start-locating is completed. When it is determined in step S153 that the start-locating is completed, the process proceeds to step S154.

In step S154, the AV/C command response processing section 41 transmits a signal indicating "accepted" to the IRD 2, and processing is terminated.

When it is determined in step S151 that the SmartFile cannot be processed, the process proceeds to step S155, whereby the AV/C command response processing section 41 outputs a signal indicating "not implemented" to the IRD 2, and processing is terminated.

When it is determined in step S153 that the start-locating is not completed, the process proceeds to step S156.

In step S156, the AV/C command response processing section 41 inquires again the tape-running-system control section 44 as to whether or not the tape running control device 36 is out of control or is suspended. When it is determined in step S156 that the tape running control device 36 is neither out of control nor is suspended, the process returns to step S153, and processing of step S153 and subsequent steps is repeated.

When it is determined in step S156 that the tape running control device 36 is out of control or is suspended, the process proceeds to step S157, whereby the AV/C command response processing section 41 returns "rejected" to the IRD 2, and processing is terminated.

The description now turns to the process of step S82 (see FIG. 49).

In step S82, the CPU 20 determines whether or not the received AV/C response is "not implemented". In this example, since the AV/C response is "accepted", it is determined that the AV/C response is not "not implemented", and the process proceeds to step S83.

In step S83, the CPU 20 determines whether or not an AV/C response has occurred. In this example, since the AV/C response of "accepted" has occurred, it is determined that the state is not "no response", and the process proceeds to step S84.

In step S84, the CPU 20 determines whether or not the AV/C response is "rejected". In this example, since the AV/C response is "accepted", it is determined that the response is not "rejected", and the process proceeds to step S85.

In step S85, the CPU 20 determines whether or not the AV/C response is "interim". In this example, since the AV/C response is "accepted", the process proceeds to step S86.

In step S86, the CPU 20 determines whether or not the AV/C response is "accepted". In this example, since the AV/C response is "accepted", the process proceeds to step S87.

In step S87, the CPU 20 detects search completion and transmits an AV/C command for playback, and processing is terminated.

When it is determined in step S82 that the AV/C response is "not implemented", the CPU 20 assumes that the D-VHS 5 has no start-locating function, and processing is terminated.

When it is determined in step S83 that the AV/C response has not occurred, the process proceeds to step S88, whereby the CPU 20 determines whether or not the determination of "no AV/C response" has occurred a second time. When it is determined that the determination of "no AV/C response" has not occurred a second time, the process returns to step S81, and processing of step S81 and subsequent steps is repeated. When it is determined in step S88 that the determination of "no AV/C response" has occurred a second time, processing is terminated.

When it is determined in step S84 that the AV/C response is "rejected", the process proceeds to step S1 (see FIG. 41), and processing of step S1 and subsequent steps is repeated.

When it is determined in step S85 that the AV/C response is "interim", since the D-VHS 5 is in process, the CPU 20 is placed in a waiting state until the process is completed.

When it is determined in step S86 that the AV/C response is not "accepted", the process returns to step S1 (see FIG. 41), and processing of step S1 and subsequent steps is repeated.

In the foregoing, although an operation when the IRD 2 instructs the D-VHS 5 to perform start-locating and playback has been described, the retrieval of an unrecorded portion can be processed by the same operation, and the retrieval is possible by omitting the playback starting process in the process of step S87.

Figure 51:
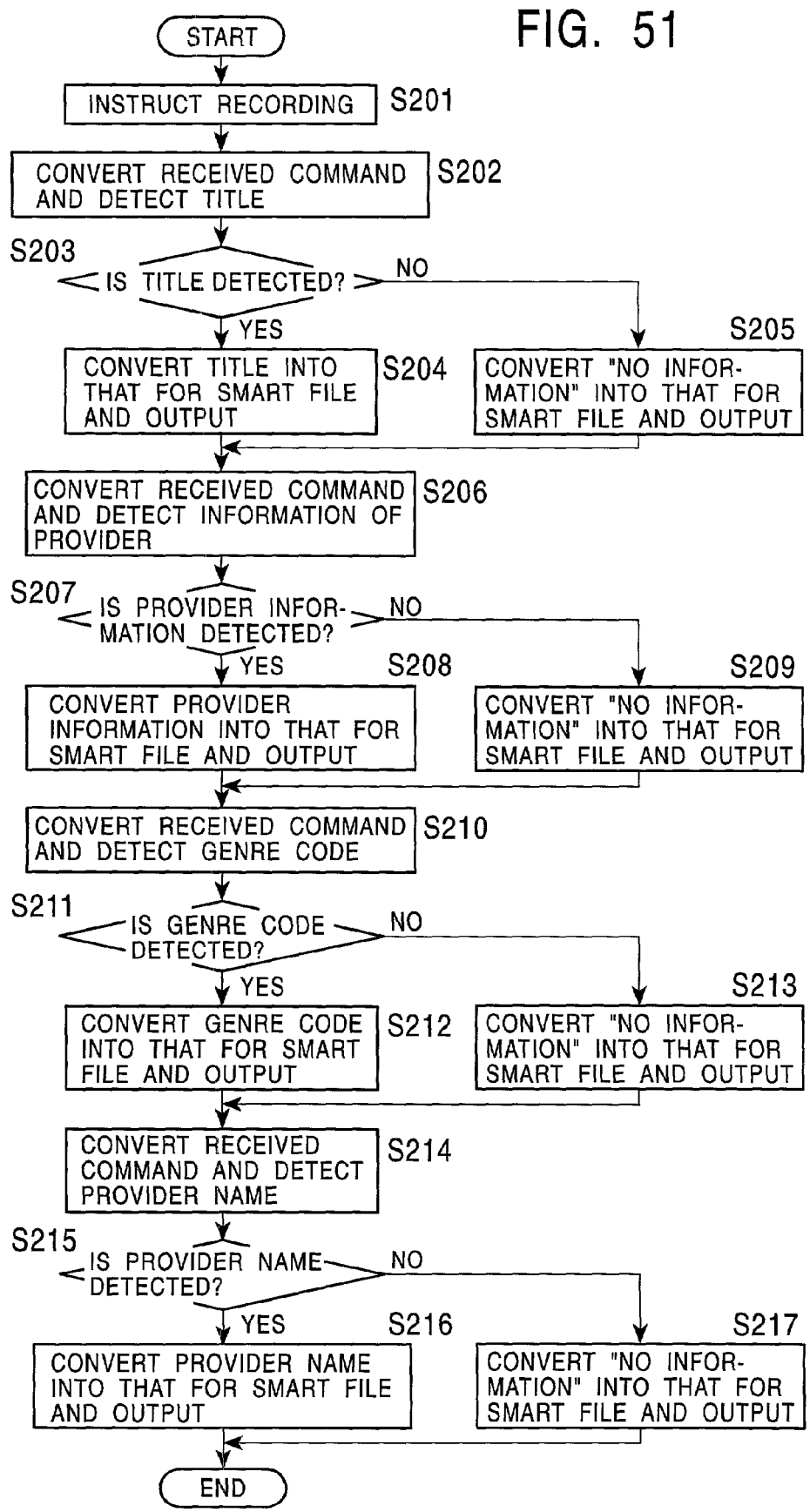
FIG. 51 is a flowchart illustrating the operation when the IRD requests recording of the TOC.
Figure 52:
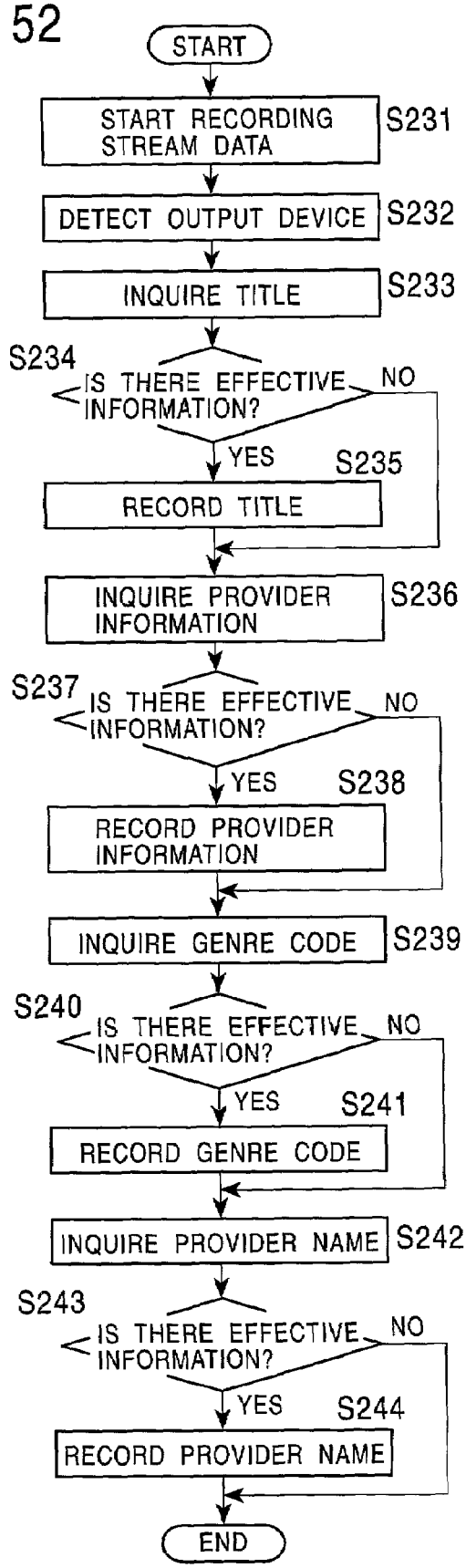
FIG. 52 is a flowchart illustrating the operation when the D-VHS performs recording.

Next, referring to the flowcharts in FIGS. 51 and 52, a description is given of the operation when an instruction for recording a program is output from the IRD 2 to the D-VHS 5 and the D-VHS 5 records relevant information together with a stream.

In step S201 of FIG. 51, when the operation panel 23 or the remote controller 25 is operated by the user, the IRD 2 instructs the D-VHS 5 to record a predetermined program.

Here, the processing of the D-VHS 5 when this program recording instruction is received is described with reference to the flowchart in FIG. 52. In step S231, the AV/C command response processing section 41 of the microcomputer 32 of the D-VHS 5 outputs an instruction for a recording operation to the tape-running-system control section 44. The tape-running-system control section 44 controls the magnetic head 37 of the tape running control device 36 in accordance with the instruction from the AV/C command response processing section 41 so that the stream input from the IEEE 1394 interface 31 is recorded in the video cassette 51, and the process proceeds to step S232.

In step S232, the AV/C command response processing section 41 detects a device which is outputting a stream in accordance with the AV/C command for a recording instruction. Therefore, in this example, the IRD 2 detects that a stream is being output.

In step S233, when a predetermined time elapses from the start of the recording of the stream, the AV/C command response processing section 41 outputs an AV/C command which requests the title data of the program to the IRD 2, and receives an AV/C response of the program title from the IRD 2.

Here, a description is given of the processing when the IRD 2 returns the AV/C response of the program title when the AV/C response which inquires as to this program title is received.

In step S202 (see FIG. 51), when the CPU 20 of the IRD 2 receives the AV/C command, the CPU 20 converts the AV/C command into a command which can be recognized by the IRD 2 on the basis of the correspondence table of FIG. 4, recorded in the ROM 22, and starts detecting the program title.

In step S203, the CPU 20 determines whether or not the title is detected from the stream. When it is determined in step S203 that the CPU 20 has detected the title, the process proceeds to step S204.

In step S204, the CPU 20 converts the data of the detected program title into an AV/C response of FIG. 28 of the SmartFile and outputs it to the D-VHS 5.

When it is determined in step S203 that the CPU 20 could not detect the title, "no information" is converted into an AV/C response and this is output to the D-VHS 5.

Here, the processing of the D-VHS 5 which has received the AV/C response of the program title is described. In step S234 (see FIG. 52), the AV/C command response processing section 41 of the microcomputer 32 of the D-VHS 5 determines whether or not the information of the program title received in the process of step S233 is valid information. That is, the AV/C command response processing section 41 determines whether or not the information of the program title has been sent or "no information" has been sent. When it is determined in step S234 that the received AV/C response is valid information, the process proceeds to step S235.

In step S235, the AV/C command response processing section 41 outputs the information of the program title which is received as the AV/C response to the SmartFile information access section 42. The SmartFile information access section 42 outputs the information of the received program title as SmartFile information to the memory 33 and stores the information therein. Furthermore, the SmartFile information access section 42 outputs an instruction for recording the program title as SmartFile information to the SmartFile R/W control section 43. The SmartFile R/W control section 43 controls the SmartFile element R/W device 34 so that the SmartFile information of the program title stored in the memory 33 via the duplexer antenna 35 is recorded in the SmartFile 52 of the video cassette 51, and the process proceeds to step S236.

When it is determined in step S234 that the received AV/C response is not valid information, the process of step S235 is skipped, and the process proceeds to step S236.

In step S236, the AV/C command response processing section 41 outputs an AV/C command which inquires as to the provider information (the channel number which is being received currently) to the IRD 2.

Here, a description is given of the processing when the IRD 2 returns an AV/C response of this provider information when the AV/C command which inquires as to the provider information is received.

In step S206 (see FIG. 51), when the CPU 20 of the IRD 2 receives the AV/C command which inquires as to the provider information, the CPU 20 converts the AV/C command into a command which can be recognized by the IRD 2 on the basis of the correspondence table of FIG. 4 recorded in the ROM 22, and starts detecting the provider information.

In step S207, the CPU 20 determines whether or not the provider information is detected from the stream. When it is determined in step S207 that the CPU 20 has detected the provider information, the process proceeds to step S208.

In step S208, the CPU 20 converts the data of the detected provider information into an AV/C response of FIG. 36 of the SmartFile, and outputs it to the D-VHS 5.

When it is determined in step S207 that the CPU 20 could not detect the provider information, "no information" is converted into an AV/C response, and this is output to the D-VHS 5.

Here, a description is given of the processing of the D-VHS 5 which has received the AV/C response of the provider information. In step S237 (see FIG. 52), the AV/C command response processing section 41 of the microcomputer 32 of the D-VHS 5 determines whether or not the provider information received in the process of step S233 is valid information. That is, the AV/C command response processing section 41 determines whether the provider information has been sent or "no information" has been sent. When it is determined in step S237 that the received AV/C response is valid information, the process proceeds to step S238.

In step S238, the AV/C command response processing section 41 outputs the provider information received as an AV/C response to the SmartFile information access section 42. The SmartFile information access section 42 outputs the received provider information as SmartFile information to the memory 33, and stores the information therein. Furthermore, the SmartFile information access section 42 outputs an instruction for causing the provider information to be recorded as SmartFile information to the SmartFile R/W control section 43. The SmartFile R/W control section 43 controls the SmartFile element R/W device 34 so that the SmartFile information of the provider information stored in the memory 33 via the duplexer antenna 35 is stored in the SmartFile 52 of the video cassette 51, and the process proceeds to step S239.

When it is determined in step S237 that the received AV/C response is not valid information, the process of step S238 is skipped, and the process proceeds to step S239.

In step S239, the AV/C command response processing section 41 outputs to the IRD 2 an AV/C command such as that shown in FIG. 35 which inquires as to the genre code.

Here, a description is given of the processing when the IRD 2 returns the AV/C response of this genre code when the AV/C command which inquires as to the genre code is received.

In step S210 (see FIG. 51), when the CPU 20 of the IRD 2 receives the AV/C command which inquires as to the genre code, the CPU 20 converts the AV/C command into a command which can be recognized by the IRD 2 on the basis of the correspondence table of FIG. 4, stored in the ROM 22, and starts detecting the genre code.

In step S211, the CPU 20 determines whether or not the genre code is detected from the stream. When it is determined in step S211 that the CPU 20 has detected the genre code, the process proceeds to step S212.

In step S212, the CPU 20 converts the detected genre code on the basis of the correspondence table of FIG. 5, further converts it into an AV/C response of the SmartFile on the basis of the correspondence table of FIG. 4, and outputs it to the D-VHS 5.

When it is determined in step S211 that the CPU 20 could not detect the genre code, "no information" is converted into an AV/C response, and this is output to the D-VHS 5.

Here, the processing of the D-VHS 5 which has received the AV/C response of the genre code is described. In step S240 (see FIG. 52), the AV/C command response processing section 41 of the microcomputer 32 of the D-VHS 5 determines whether or not the genre code received in the process of step S239 is valid information. That is, the AV/C command response processing section 41 determines whether the genre code has been sent or "no information" has been sent. When it is determined in step S240 that the received AV/C response is valid information, the process proceeds to step S241.

In step S241, the AV/C command response processing section 41 outputs the genre code to the SmartFile information access section 42. The SmartFile information access section 42 outputs the received genre code to the memory 33 and stores the genre code therein. Furthermore, the SmartFile information access section 42 causes the SmartFile R/W control section 43 to record the genre code, the SmartFile R/W control section 43 controls the SmartFile element R/W device 34 in order to store the genre code in the SmartFile 52, and the process proceeds to step S242.

When it is determined in step S240 that the received AV/C response is not valid information, the process of step S241 is skipped, and the process proceeds to step S242.

In step S242, the AV/C command response processing section 41 outputs an AV/C command which inquires as to the provider name to the IRD 2.

Here, a description is given of the processing when the IRD 2 returns an AV/C response of this provider name when an AV/C command which inquires as to the provider name is received.

In step S214 (see FIG. 51), when the CPU 20 of the IRD 2 receives the AV/C command which inquires as to the provider name, the CPU 20 converts the AV/C command into a command which can be recognized by the IRD 2 on the basis of the correspondence table of FIG. 4, recorded in the ROM 22, and starts detecting the provider name.

In step S215, the CPU 20 determines whether or not the provider name is detected from the stream data. When it is determined in step S215 that the CPU 20 has detected the provider name, the process proceeds to step S216.

In step S216, the CPU 20 converts the detected provider name into an AV/C command of the SmartFile on the basis of the correspondence table of FIG. 4 and outputs it to the D-VHS 5, and processing is terminated.

When it is determined in step S215 that the CPU 20 could not detect the provider name, "no information" is converted into an AV/C response, and this is output to the D-VHS 5.

Here, a description is given of the processing of the D-VHS 5 which has received the AV/C response of the provider name. In step S243 (see FIG. 52), the AV/C command response processing section 41 of the microcomputer 32 of the D-VHS 5 determines whether or not the provider name received in the process of step S242 is valid information. That is, the AV/C command response processing section 41 determines whether the provider name has been sent or "no information" has been sent. When it is determined in step S243 that the received AV/C response is valid information, the process proceeds to step S244.

In step S244, the AV/C command response processing section 41 outputs the provider name to the SmartFile information access section 42. The SmartFile information access section 42 outputs the received provider information to the memory 33 and stores the information therein. Furthermore, the SmartFile information access section 42 causes the SmartFile R/W control section 43 to record the provider name, and the SmartFile R/W control section 43 controls the SmartFile element R/W device 34 in order to store the provider name in the SmartFile 52, and processing is terminated.

When it is determined in step S243 that the received AV/C response is not valid information, the process of step S242 is skipped, and processing is terminated.

The above-described series of processing can be performed by hardware and can also be performed by software. In a case where the series of processing is performed by software, programs which form the software are installed from a recording medium into a computer incorporated into dedicated hardware or, for example, a general-purpose personal computer capable of executing various types of functions by installing various programs.

Figure 53:
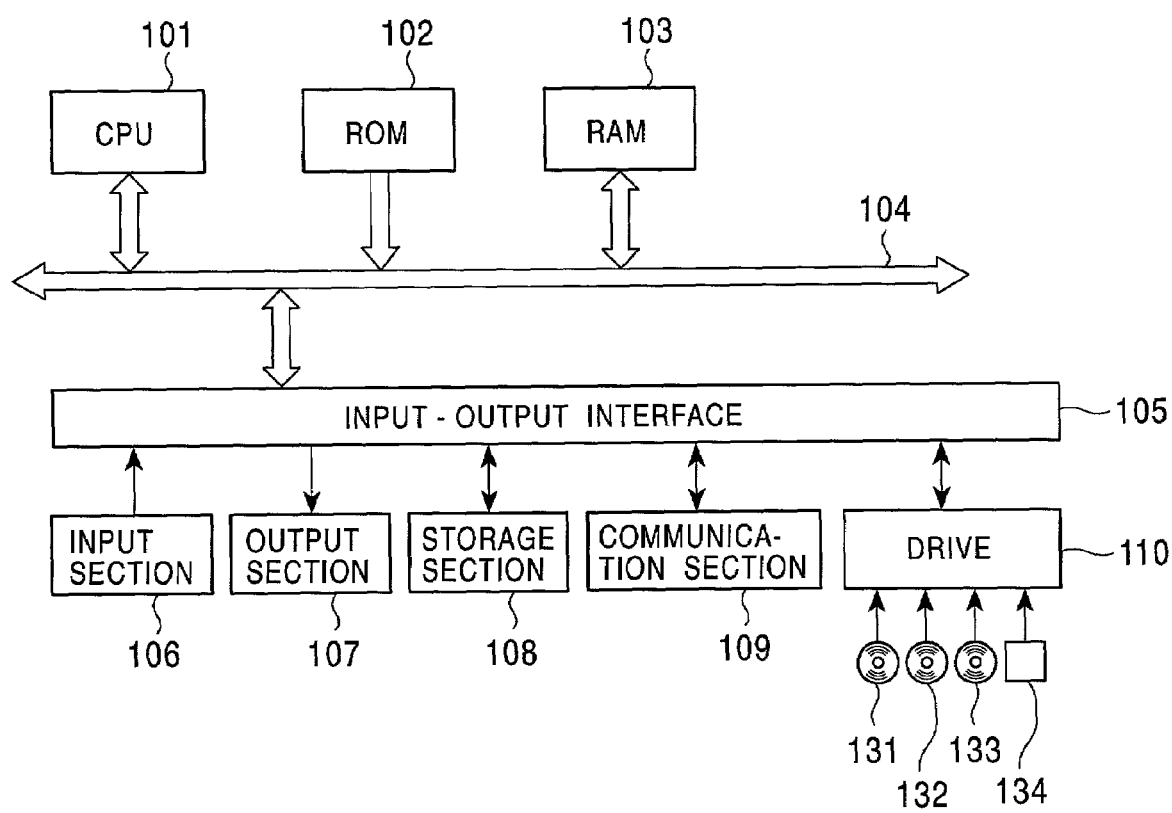
FIG. 53 is a diagram illustrating media.

FIG. 53 shows the construction of an embodiment of a personal computer. A CPU 101 of the personal computer controls the entire operation of the personal computer. When an instruction is input as a result of the user operating an input section 106 formed of a keyboard, a mouse, etc., via a bus 104 and an input-output interface 105, the CPU 101 executes a program stored in a ROM (Read Only Memory) 102 in accordance with the instruction. Alternatively, the CPU 101 loads a program which is read from a magnetic disk 131, an optical disk 132, a magneto-optical disk 133, or a semiconductor memory 134, which is connected to a drive 110, and which is installed into a storage section 108, into a RAM (Random Access Memory) 103, and executes the program. In addition, the CPU 101 controls a communication section 109 in order to communicate with the outside and to execute exchange of data.

This recording medium, as shown in FIG. 53, is constructed by not only package media formed of the magnetic disk 131 (including a floppy disk), the optical disk 132 (including a CD-ROM (Compact Disk-Read Only Memory), and a DVD (Digital Versatile Disc)), the magneto-optical disk 133 (including an MD (Mini-Disk)), or the semiconductor memory 134, in which programs are recorded, which is distributed separately from the computer so as to distribute programs to a user, but also is constructed by the ROM 102, a hard disk contained in the storage section 108, etc., in which programs are recorded, which is distributed to a user in a state in which it is incorporated in advance into the computer.

In this specification, steps which describe a program recorded in a recording medium contain not only processing performed in a time-series manner along the described sequence, but also processing performed in parallel or individually although the processing is not necessarily performed in a time-series manner.

According to the information processing apparatus, the information processing method, and the recording medium of the present invention, content information of a program is extracted, relevant information of the program is extracted, in order that the extracted content information is recorded in a first recording medium of another information processing apparatus, the content information is output to the other information processing apparatus via a network, the extracted relevant information is converted into a format in which the relevant information can be processed by the other information processing apparatus, and in order that the relevant information whose format is converted is recorded in a second recording medium of the other information processing apparatus, the relevant information is output to the other information processing apparatus via the network.

According to the information processing apparatus, the information processing method, and the recording medium of the present invention, relevant information recorded in a second recording medium of another information processing apparatus is read via a network, the read relevant information is converted into a format in which the relevant information can be processed, the display of the relevant information whose format is converted is controlled, a desired program is selected on the basis of the relevant information whose display is controlled, the other information processing apparatus is controlled via the network, and the content information of the selected program is played back from the first recording medium.

According to the information processing apparatus, the information processing method, and the recording medium of the present invention, a first instruction is obtained from another information processing apparatus via a network, the content information of a program supplied from the other information processing apparatus via the network is recorded in a first recording medium on the basis of the obtained first instruction, a second instruction is obtained from the other information processing apparatus via the network, and the relevant information of the program is recorded in the second recording medium attached to the first recording medium in accordance with the obtained second instruction.

According to the information processing apparatus, the information processing method, and the recording medium of the present invention, a first instruction is obtained from another information processing apparatus via a network, relevant information recorded in a second recording medium is read and output to the other information processing apparatus via the network in accordance with the first instruction, information about the content information of a program selected by the other information processing apparatus is obtained based on the read relevant information, and the content information is played back from the first recording medium based on the obtained content information.

In each of the above, it is possible for an information processing apparatus to control another information processing apparatus which is connected via a network so that content information and relevant information are recorded, the stored relevant information is always updated to the latest one, a program is selected on the basis of the latest relevant information, and the content information is played back.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus for receiving a broadcast signal and for transmitting information about a program created front said broadcast signal to another information processing apparatus which is connected via a network, said information processing apparatus comprising:
    first extraction means for extracting content information of said program;
    second extraction means for extracting relevant information of said program;
    first output means for outputting said content information extracted by said first extraction means to said other information processing apparatus via said network so that said content information is recorded in a first recording medium of said other information processing apparatus;
    conversion means for converting said relevant information extracted by said second extraction means into a format in which the information can be processed by said other information processing apparatus;
    receiving means for receiving an instruction to send said relevant information of said program from said other information processing apparatus via said network; wherein said instruction is received at a predetermined time after said content information starts recording in said first recording medium, such that said relevant information is extracted reliably; and
    second output means for outputting said relevant information whose format is converted by said conversion means to said other information processing apparatus via said network so that said relevant information whose format is converted by said conversion means is recorded in a second recording medium of said other information processing apparatus in response to said instruction.

2. An information processing apparatus according to claim 1, wherein said network comprises an IEEE 1394 serial bus.

3. An information processing apparatus according to claim 1, wherein said first recording medium is a video cassette.

4. An information processing apparatus according to claim 1, wherein said second recording medium is an IC card attached to said first recording medium.

5. An information processing apparatus according to claim 1, wherein said relevant information contains at least one of the title, provider information, a provider name, a genre code, the recorded position in the first recording medium, the recording start date and time, and the number of updates.

6. An information processing method for use with an information processing apparatus for receiving a broadcast signal and for transmitting information of a program created from said broadcast signal to another information processing apparatus which is connected via a network, said information processing method comprising:
    a first extraction step of extracting content information of said program;
    a second extraction step of extracting relevant information of said program;
    a first output step of outputting said content information extracted in said first extraction step to said other information processing apparatus via said network so that the information is recorded in a first recording medium of said other information processing apparatus;
    a conversion step of converting said relevant information extracted in said second extraction step into a format in which the information can be processed by said other information processing apparatus;
    a receiving step of receiving an instruction to send said relevant information of said program from said other information processing apparatus via said network; wherein said instruction is received at a predetermined time after said content information starts recording in said first recording medium, such that said relevant information is extracted reliably; and
    a second output step of outputting said relevant information whose format is converted in said conversion step to said other information processing apparatus via said network so that the information is recorded in a second recording medium of said other information processing apparatus in response to said instruction.

7. A computer-readable recording medium, having recorded therein a program, for use with an information processing apparatus for receiving a broadcast signal and for transmitting information of a program created from said broadcast signal to another information processing apparatus which is connected via a network, said program comprising:
    a first extraction step of extracting content information of said program;
    a second extraction step of extracting relevant information of said program;
    a first output step of outputting said content information extracted in said first extraction step to said other information processing apparatus via said network so that the information is recorded in a first recording medium of said other information processing apparatus;

a conversion step of converting said relevant information extracted in said second extraction step into a format in which the information can be processed by said other information processing apparatus;

a receiving step of receiving an instruction to send said relevant information of said program from said other information processing apparatus via said network; wherein said instruction is received at a predetermined time after said content information starts recording in said first recording medium, such that said relevant information is extracted reliably; and a second output step of outputting said relevant information whose format is converted in said conversion step to said other information processing apparatus via said network so that the information is recorded in a second recording medium of said other information processing apparatus in response to said instruction.

8. An information processing apparatus for recording information of programs from another information processing apparatus which is connected through a network, said information processing apparatus comprising;

first acquiring means for acquiring a first instruction from said other information processing apparatus via said network;

first recording means for recording content information of said program supplied from said other information processing apparatus via said network into a first recording medium on the basis of said first instruction acquired by said acquiring means;

second acquiring means for acquiring a second instruction from said other information processing apparatus via said network;

output means for outputting a third instruction of sending relevant information of said program to said other information processing apparatus via said network; wherein said third instruction is output at a predetermined time after said content information starts recording in said first recording medium, such that said relevant information is extracted reliably;

third acquiring means for acquiring said relevant information as a response of said third instruction; and second recording means for recording said relevant information of said program into a second recording medium which is attached to said first recording medium on the basis of said second instruction acquired by said second acquiring means and for recording said relevant information of said program acquired by said third acquiring means into a second recording medium.

9. An information processing apparatus according to claim 8, wherein said network comprises an IEEE 1394 serial bus.

10. An information processing apparatus according to claim 8, wherein said first recording medium is a video cassette.

11. An information processing apparatus according to claim 8, wherein said second recording medium is an IC card attached to said first recording medium.

12. An information processing apparatus according to claim 8, wherein said relevant information contains at least one of the title, provider information, a provider name, a genre code, the recorded position in the first recording medium, the recording start date and time, and the number of updates.

13. An information processing method for use with an information processing apparatus for recording information of a program from another information processing apparatus which is connected through a network, said information processing method comprising:

a first acquiring step of acquiring a first instruction from said of other information processing apparatus via said network;

a first recording step of recording content information of said program, supplied from said other information processing apparatus via said network, into a first recording medium on the basis of said first instruction acquired in said first acquiring step;

a second acquiring step of acquiring a second instruction from said other information processing apparatus via said network;

an output step of outputting a third instruction of sending relevant information of said program to said other information processing apparatus via said network; wherein said third instruction is output at a predetermined time after said connent information starts recording in said first recording medium, such that said relevant information is extracted reliably;

a third acquiring step of acquiring said relevant information as a response of said third instruction; and a second recording step of recording the relevant information of said program into a second recording medium attached to said first recording medium on the basis of said second instruction acquired in said second acquiring step and for recording said relevant information of said program acquired in said third acquiring step into a second recording medium.

14. A computer-readable recording medium, having recorded therein a program, for use with an information processing apparatus for recording information of a program from another information processing apparatus which is connected through a network, said program comprising:

a first acquiring step of acquiring a first instruction from said other information processing apparatus via said network;

a first recording step of recording content information of said program, supplied from said other information processing apparatus via said network, into a first recording medium on the basis of said first instruction acquired in said first acquiring step;

a second acquiring step of acquiring a second instruction from said other information processing apparatus via said network;

an output step of outputting a third instruction of sending relevant information of said program to said other information processing apparatus via said network; wherein said third instruction is output at a predetermined time after said connent information starts recording in said first recording medium, such that said relevant information is extracted reliably;

a third acquiring step of acquiring said relevant information as a response of said third instruction; and a second recording step of recording the relevant information of said program into a second recording medium attached to said first recording medium on the basis of said second instruction acquired in said second acquiring step and for recording said relevant information of said program acquired in said third acquiring step into a second recording medium.

* * * * *

UNITED STATES PATENT AND TRADEMARK OFFICE
CERTIFICATE OF CORRECTION

| | | |
|---|---|---|
| PATENT NO. | : 7,062,151 B2 | Page 1 of 1 |
| APPLICATION NO. | : 09/727919 | |
| DATED | : June 13, 2006 | |
| INVENTOR(S) | : Yukihiko Aoki, Shinichiro Sugai and Keiji Kaneko | |

It is certified that error appears in the above-identified patent and that said Letters Patent is hereby corrected as shown below:

In claim 1, column 31, line 44, "front" should read --from--.

In claim 7, column 33, line 10, "relevant:" should read --relevant--.

In claim 8, column 33, line 24, "comprising;" should read --comprising:--.

In claim 13, column 34, line 7, "said of other" should read --said other--.

In claim 13, column 34, line 20, "connent" should read --content--.

In claim 14, column 34, line 52, "connent" should read --content--.

Signed and Sealed this

Twelfth Day of December, 2006

JON W. DUDAS
*Director of the United States Patent and Trademark Office*